United States Patent [19]

Doswald et al.

[11] Patent Number: 5,721,343
[45] Date of Patent: Feb. 24, 1998

[54] FIBRE-REACTIVE AZO DYESTUFFS CONTAINING A HALO SUBSTITUTED PYRIMIDINE SUBSTITUENT

[75] Inventors: Paul Doswald, Münchenstein, Switzerland; Rainer Nusser, Müllheim, Germany; Roland Wald, Huningue, France

[73] Assignee: Clariant Finance (BVI) Limited, Tortola, Virgin Islands (Br.)

[21] Appl. No.: 431,649

[22] Filed: May 2, 1995

Related U.S. Application Data

[63] Continuation of Ser. No. 135,038, Oct. 12, 1993, abandoned.

[30] Foreign Application Priority Data

Oct. 12, 1992 [DE] Germany ............... 42 34 317.8
Mar. 2, 1993 [DE] Germany ............... 43 06 380.2

[51] Int. Cl.⁶ .................. C09B 62/026; C09B 62/24; D06P 1/384; D06P 3/10; D06P 31/66; D06P 3/32
[52] U.S. Cl. .................. 534/634; 534/617; 534/622; 534/624; 534/627; 534/632; 534/635; 534/636; 534/637; 534/638
[58] Field of Search .................. 534/622, 624, 534/627, 634, 635, 638, 636, 637, 632, 617

[56] References Cited

U.S. PATENT DOCUMENTS

| | | | |
|---|---|---|---|
| 3,669,951 | 6/1972 | Bien et al. I | 534/627 |
| 4,007,164 | 2/1977 | Bien et al. II | 534/627 |
| 4,067,864 | 1/1978 | Oesterlein et al. | 534/635 |
| 5,227,476 | 7/1993 | Doswald et al. | 534/634 |
| 5,227,477 | 7/1993 | Auerbach et al. II | 534/634 |
| 5,340,928 | 8/1994 | Hoppe et al. | 534/618 |
| 5,342,927 | 8/1994 | Reddig et al. | 534/618 |
| 5,359,041 | 10/1994 | Reddig et al. | 534/635 |
| 5,386,015 | 1/1995 | Doswald et al. | 534/637 |
| 5,436,324 | 7/1995 | Reddig et al. | 534/625 |

FOREIGN PATENT DOCUMENTS

| | | | |
|---|---|---|---|
| 0 377 902 | 7/1990 | European Pat. Off. | 534/642 |
| 0 443 165 | 8/1991 | European Pat. Off. | 534/634 |
| 0 453 895 | 10/1991 | European Pat. Off. | 534/638 |
| A1 0 286 113 | 3/1992 | European Pat. Off. | 534/634 |
| 0 513 622 | 11/1992 | European Pat. Off. | 534/634 |
| 0 522 399 | 1/1993 | European Pat. Off. | 534/635 |
| 0 525 572 | 2/1993 | European Pat. Off. | 534/638 |
| 0 526 792 | 2/1993 | European Pat. Off. | 534/638 |
| A1 3 835 659 | 4/1990 | Germany | 534/634 |
| A1 3 900 098 | 7/1990 | Germany | 534/634 |
| 1035779 | 7/1966 | United Kingdom | 534/627 |
| 1 305 754 | 2/1973 | United Kingdom | 534/634 |
| 2 169 306 | 7/1986 | United Kingdom | 534/634 |
| 2 200 131 | 7/1988 | United Kingdom | 534/634 |
| 2219804 | 12/1989 | United Kingdom | 534/624 |
| 2 238 056 | 5/1991 | United Kingdom | 534/634 |
| 2 239 025 | 6/1991 | United Kingdom | 534/634 |
| 2 269 595 | 2/1994 | United Kingdom | 534/634 |

*Primary Examiner*—Floyd D. Higel
*Attorney, Agent, or Firm*—Gabriel Lopez; Carol A. Loeschorn

[57] ABSTRACT

Fiber-reactive monoazo and disazo compounds of the formula $$D-N=N-K$$

which compounds are in free acid or salt form, and mixtures thereof, are useful for dyeing or printing hydroxy group- or nitrogen-containing organic substrates, for example leather and fiber material comprising natural or synthetic polyamides or natural or regenerated cellulose; the most preferred substrate is a textile material comprising cotton.

17 Claims, No Drawings

FIBRE-REACTIVE AZO DYESTUFFS CONTAINING A HALO SUBSTITUTED PYRIMIDINE SUBSTITUENT

This is a continuation of application Ser. No. 08/135,038, filed Oct. 12, 1993, now abandoned.

This invention relates to fibre-reactive monoazo and disazo compounds and processes for their production. These compounds are suitable for use as fibre-reactive dyestuffs in any conventional dyeing or printing processes.

More particularly, the invention provides compounds of formula I

    I and salts thereof, or a mixture of such compounds or salts, in which D is one of the radicals ($d_1$) to ($d_5$),

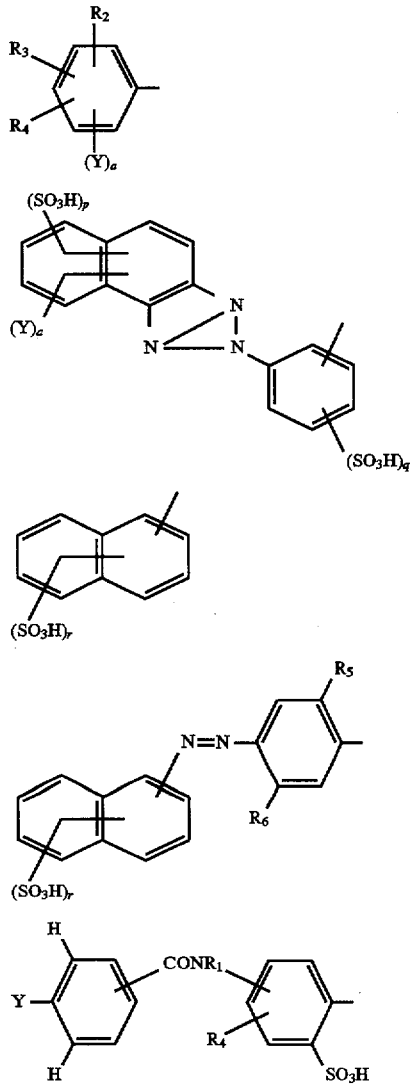

K is one of the radicals ($k_1$) to ($k_4$);

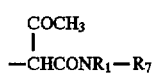 ($k_1$)

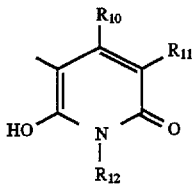 ($k_2$)

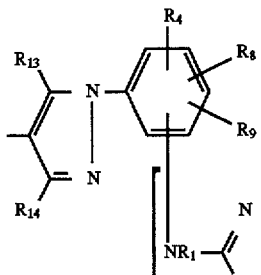 ($k_3$)

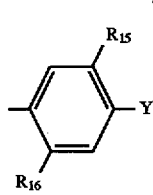 ($k_4$)

with the provisos that (i) a compound of formula I contains at least one sulphonic acid group;

(ii) a compound of formula I contains one or two radicals Y;

(iii) at least one of the radicals Y contains the radical

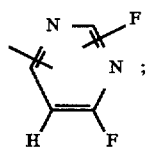

and (iv) when D is ($d_3$) and K is ($k_4$), Y in ($k_4$) is other than

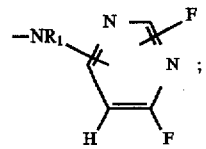

or

D is one of the radicals ($d_1$) to ($d_4$) above, or ($d_6$) or ($d_7$) of the formula

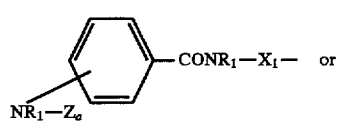 ($d_6$)

and

-continued

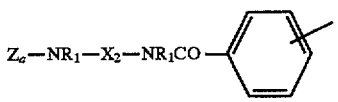   (d₇)

and

K is a radical (k₅)

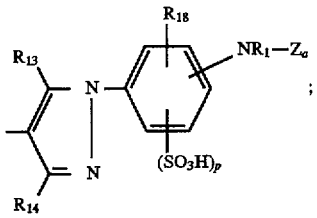   (k₅)

with the proviso that
when D is (d₁) to (d₄), the same provisos (i) to (iv) as given above apply;
in which
each
Y is independently —NR₁-$Z_a$ or

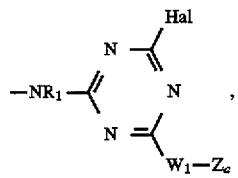, each
$Z_a$ is independently

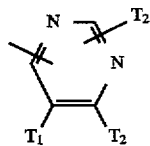

wherein $T_1$ is hydrogen, cyano or chloro, and the two $T_2$'s are the same and each $T_2$ is fluoro or chloro;
each of
a and b is independently 0 or 1,
each
R₁ is independently hydrogen, C₁₋₄alkyl or substituted C₁₋₄alkyl,
Hal is fluoro or chloro,
W₁ is —NR₁—B₁—NR₁—,

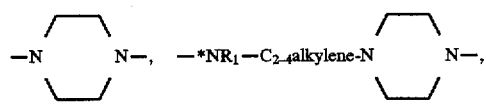

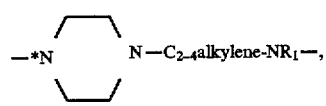

-continued

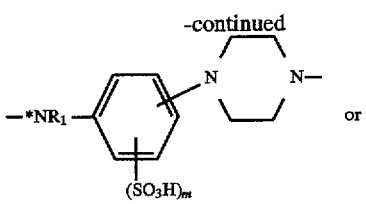 or

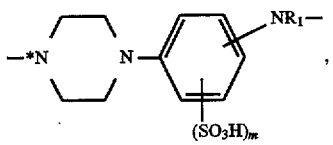, in which the marked nitrogen atom is attached to a carbon atom of the triazine ring;
B₁ is C₂₋₆alkylene, —C₂₋₃alkylene-Q-C₂₋₃alkylene-, wherein Q is —O— or —NR₁—; C₃₋₄alkylene monosubstituted by hydroxy,

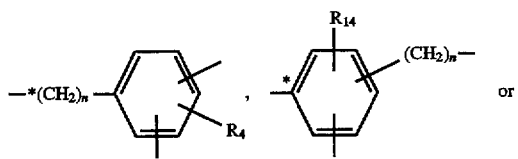

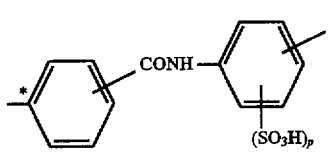, wherein the marked carbon atom is attached to the NR₁-group which is bound to a carbon atom of the triazine ring;
R₂ is hydrogen, C₁₋₄alkyl, C₁₋₄alkoxy or sulpho,
R₃ is hydrogen, C₁₋₄alkyl, C₁₋₄alkoxy, halogen or carboxy,
each
R₄ is independently hydrogen or sulpho,
R₅ is hydrogen, C₁₋₄alkyl or C₁₋₄alkoxy,
R₆ is hydrogen, C₁₋₄alkyl, C₁₋₄alkoxy, acetamido or —NHCONH₂,
R₇ is

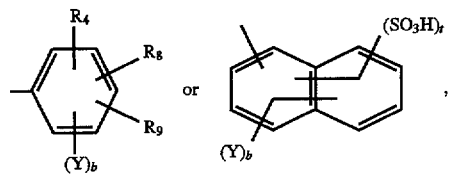, each
R₈ is independently hydrogen, C₁₋₄alkyl, C₁₋₄alkoxy, halogen or sulpho,
each
R₉ is independently hydrogen, C₁₋₄alkyl, C₁₋₄alkoxy, halogen or carboxy,
R₁₀ is C₁₋₄alkyl or —CH₂SO₃H,
R₁₁ is hydrogen; —CONH₂; sulpho; C₁₋₄alkyl which is monosubstituted by hydroxy, halogen, cyano, C₁₋₄alkoxy, sulpho, —OSO₃H or —NH₂; or —CH₂—Y, $R_{12}$ is hydrogen; $C_{1-6}$alkyl; substituted $C_{1-6}$alkyl; cyclohexyl; phenyl or phenyl which is substituted by 1 to 3 substituents selected from halogen, $C_{1-4}$alkyl, $C_{1-4}$alkoxy, sulpho and carboxy; phenyl($C_{1-4}$alkyl) or phenyl($C_{1-4}$alkyl) the phenyl ring of which is substituted by 1 to 3 substituents selected from halogen, $C_{1-4}$alkyl, $C_{1-4}$alkoxy, sulpho and carboxy;

each $R_{13}$ is hydroxy or $-NH_2$, each $R_{14}$ is $C_{1-4}$alkyl, carboxy or $-CONH_2$, $R_{15}$ is hydrogen, $C_{1-4}$alkyl or $C_{1-4}$alkoxy, $R_{16}$ is hydrogen, $C_{1-4}$alkyl, $C_{1-4}$alkoxy, acetamido or $-NHCONH_2$, $R_{17}$ is hydrogen, $C_{1-4}$alkyl, $C_{1-4}$alkoxy, carboxy or sulpho, and each $R_{18}$ is independently hydrogen, halogen, $C_{1-4}$alkyl or $C_{1-4}$alkoxy;

$X_1$ is

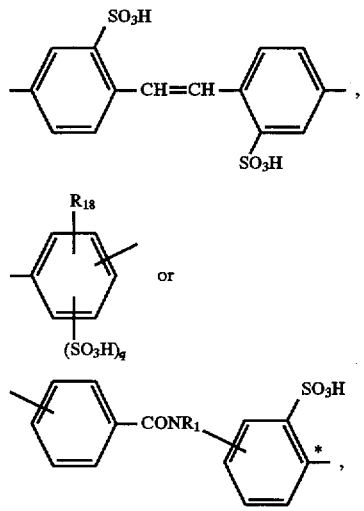

or wherein the marked carbon atom is bound to the azo group, and $X_2$ is

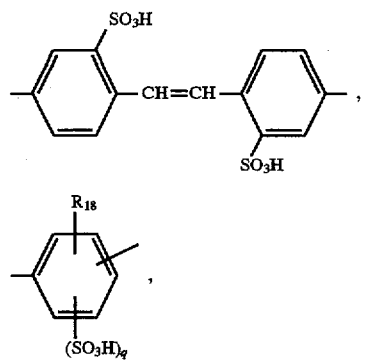

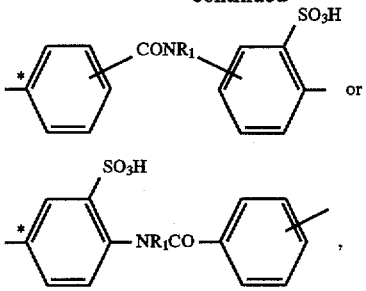

wherein the marked carbon atom is attached to the $Z_a$-$NR_1$-group;

m is 0 or 1, n is 0 or an integer 1 to 4, each p is independently 0, 1 or 2, each q is independently 1 or 2, each r is 2 or 3, and t is 1, 2 or 3.

In the specification, any alkyl, alkoxy or alkylene group present is linear or branched unless indicated otherwise. In any hydroxysubstituted alkyl or alkylene group which is attached to a nitrogen atom, the hydroxy group is preferably bound to a carbon atom which is not directly attached to the nitrogen atom. In any alkylene chain interrupted by Q which is attached to a nitrogen atom, Q is preferably bound to a carbon atom which is not directly attached to the nitrogen atom.

When $R_1$ is a substituted alkyl group, it is preferably monosubstituted by hydroxy, cyano or chloro.

Each $R_1$ is preferably $R_{1a}$, where each $R_{1a}$ is independently hydrogen, methyl, ethyl or 2-hydroxyethyl; more preferably each $R_1$ is $R_{1b}$, where each $R_{1b}$ is independently hydrogen or methyl. Most preferably each $R_1$ is hydrogen.

Any halogen as a phenyl substituent is preferably fluorine, chlorine or bromine; most preferably it is chlorine.

Hal is most preferably chlorine.

$R_{17}$ is preferably $R_{17a}$, where $R_{17a}$ is hydrogen, methyl, methoxy, carboxy or sulpho; more preferably it is $R_{17b}$, where $R_{17b}$ is hydrogen or sulpho.

$B_1$ is preferably $B_{1a}$, where $B_{1a}$ is $C_{2-3}$alkylene, $-CH_2CH_2-O-CH_2CH_2-$, $-CH_2CH_2-NR_{1b}-CH_2CH_2-$, $C_{3-4}$alkylene monosubstituted by hydroxy,

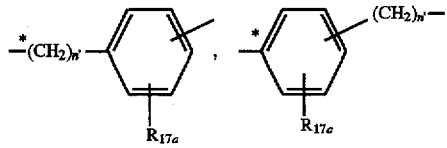

or

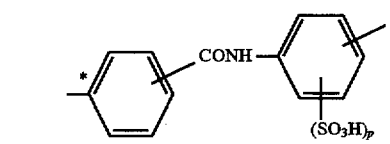

in which n' is 0 or 1;

more preferably it is $B_{1b}$, where $B_{1b}$ is $C_{2-3}$alkylene,

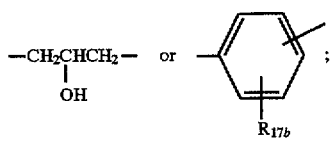

most preferably, it is $B_{1c}$, where $B_{1c}$ is —CH$_2$CH$_2$—, —CH$_2$CH$_2$CH$_2$—, —*CH$_2$CH(CH$_3$)— or —CH$_2$CH(OH)CH$_2$— in which the marked carbon atom is bound to the NR$_1$-group which is attached to a carbon atom of the triazine ring.

$W_1$ is preferably $W_{1a}$, where $W_{1a}$ is —NR$_{1a}$—B$_{1a}$—NR$_{1a}$—,

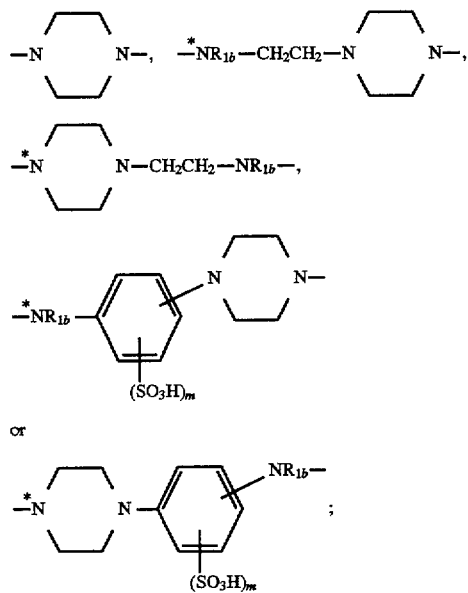

more preferably it is $W_{1b}$, where $W_{1b}$ is —NR$_{1b}$—B$_{1b}$—NR$_{1b}$— or

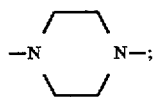

most preferably $W_1$ is $W_{1c}$, where $W_{1c}$ is —NH—B$_{1c}$—NH—.

$Z_a$ is preferably $Z_a{}'$, where $Z_a{}'$ is

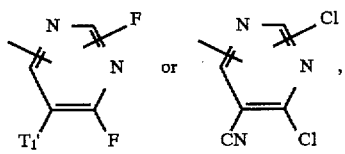

in which $T_1{}'$ is hydrogen or chloro; most preferably, $Z_a$ is

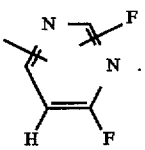

Y is preferably $Y_a$, where $Y_a$ is —NR$_{1b}$-Z$_a{}'$ or

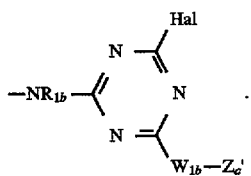

More preferably Y is $Y_b$, where $Y_b$ is

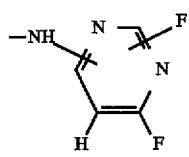

or

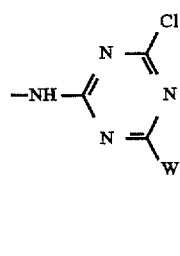

$R_2$ is preferably $R_{2a}$, where $R_{2a}$ is hydrogen, methyl, methoxy or sulpho.

$R_3$ is preferably $R_{3a}$, where $R_{3a}$ is hydrogen, methyl, methoxy, chloro or carboxy; more preferably, it is $R_{3b}$, where $R_{3b}$ is hydrogen, methyl or methoxy.

$R_5$ is preferably $R_{5a}$, where $R_{5a}$ is hydrogen, methyl or methoxy; most preferably, $R_5$ is hydrogen.

$R_6$ is preferably $R_{6a}$, where $R_{6a}$ is hydrogen, methyl, methoxy, acetamido or —NHCONH$_2$; more preferably, it is $R_{6b}$, where $R_{6b}$ is hydrogen, methyl, acetamido or —NHCONH$_2$.

$R_8$ is preferably $R_{8a}$, where $R_{8a}$ is hydrogen, methyl, methoxy, chloro or sulpho. Most preferably, $R_8$ is $R_{8b}$, where $R_{8b}$ is hydrogen, chloro or sulpho.

$R_9$ is preferably $R_{9a}$, where $R_{9a}$ is hydrogen, methyl, methoxy or chloro.

$R_7$ is preferably $R_{7a}$ of the formula

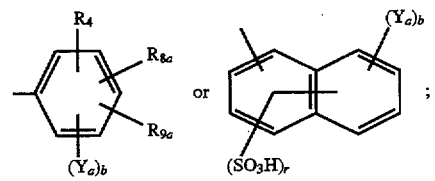

more preferably, $R_7$ is $R_{7b}$ of the formula

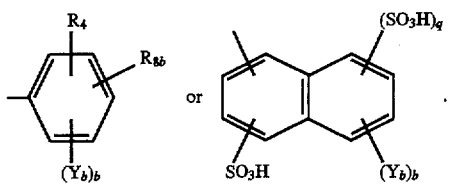

$R_{10}$ is preferably $R_{10a}$, where $R_{10a}$ is methyl or —$CH_2SO_3H$.

$R_{11}$ is preferably $R_{11a}$, where $R_{11a}$ is hydrogen, —$CONH_2$, sulpho, —$CH_2SO_3H$ or —$CH_2$—$Y_a$; more preferably, it is $R_{11b}$, where $R_{11b}$ is hydrogen, —$CH_2SO_3H$ or —$CH_2$—$Y_b$.

Any substituted $C_{1-6}$alkyl as $R_{12}$ is preferably —$C_{1-6}$alkylene-E, in which E is carboxy, sulpho, —$OSO_3H$, hydroxy, cyano, methoxy, —$NR_{19}R_{20}$ or —$^{\oplus}NR_{21}R_{22}R_{23}$ $An^{\ominus}$ wherein
each of
- $R_{19}$ and $R_{20}$ is independently hydrogen, unsubstituted $C_{1-4}$alkyl, $C_{1-4}$alkyl monosubstituted by hydroxy, $C_{1-4}$alkoxy, carboxy, sulpho, —$NHC_{1-4}$alkyl or —$N(C_{1-4}$alkyl$)_2$; cyclohexyl which is unsubstituted or substituted by one to three methyl groups; phenyl or phenyl which is substituted by 1 or 2 substituents selected from halogen, especially chloro, $C_{1-4}$alkyl, $C_{1-4}$alkoxy, sulpho and carboxy; phenyl($C_{1-4}$-alkyl) or phenyl-($C_{1-4}$alkyl) in which the phenyl ring is substituted by 1 or 2 substituents selected from halogen, especially chloro, $C_{1-4}$alkyl, $C_{1-4}$alkoxy, sulpho and carboxy; or
- —$NR_{19}R_{20}$ is piperidino, morpholino or piperazino in which the latter is unsubstituted or substituted by up to three methyl groups;

each of
- $R_{21}$ and $R_{22}$ has one of the significances of $R_{19}$ and $R_{20}$ with the exception of hydrogen, but independent thereof; and $R_{23}$ is $C_{1-4}$alkyl or benzyl, or
- —$^{\oplus}NR_{21}R_{22}R_{23}$ is a pyridinium ring which is further unsubstituted or substituted by 1 to 2 methyl groups, and $An^{\ominus}$ is a non-chromophoric anion.

Preferably E is $E_a$, where $E_a$ is carboxy, sulpho, —$OSO_3H$, hydroxy or —$NR_{19a}R_{20a}$ wherein each of $R_{19a}$ and $R_{20a}$ is independently hydrogen, methyl, ethyl, 2-hydroxyethyl or phenyl($C_{1-2}$alkyl), or —$NR_{19a}R_{20a}$ is piperidino, morpholino or piperazino.

More preferably, E is $E_b$, where $E_b$ is hydroxy, sulpho or —$NR_{19b}R_{20b}$ wherein each of $R_{19b}$ and $R_{20b}$ is independently hydrogen, methyl or ethyl.

Any $An^{\ominus}$ is preferably a chloride or acetate ion.

$R_{12}$ is preferably $R_{12a}$, where $R_{12a}$ is hydrogen, methyl, ethyl, cyclohexyl, phenyl, phenyl($C_{1-4}$alkyl) or —$C_{1-6}$alkylene-E; more preferably it is $R_{12b}$, where $R_{12b}$ is hydrogen, methyl, ethyl, cyclohexyl or —$C_{1-4}$alkylene-$E_a$; even more preferably it is $R_{12c}$, where $R_{12c}$ is hydrogen, methyl, ethyl or —$C_{1-3}$alkylene-$E_b$; most preferably, $R_{12}$ is $R_{12d}$, where $R_{12d}$ is hydrogen, methyl or ethyl.

$R_{13}$ is preferably hydroxy.

$R_{14}$ is preferably $R_{14a}$, where $R_{14a}$ is methyl or carboxy; most preferably $R_{14}$ is carboxy.

$R_{15}$ is preferably $R_{15a}$, where $R_{15a}$ is hydrogen, methyl or methoxy; most preferably $R_{15}$ is hydrogen.

$R_{16}$ is preferably $R_{16a}$, where $R_{16a}$ is hydrogen, methyl, methoxy, acetamido or —$NHCONH_2$; more preferably $R_{16a}$ is $R_{16b}$, where $R_{16b}$ is hydrogen, methyl, acetamido or —$NHCONH_2$.

Each $R_{18}$ is preferably $R_{18a}$, where each $R_{18a}$ is independently hydrogen, chloro, methyl or methoxy. More preferably it is $R_{18b}$, where each $R_{18b}$ is independently hydrogen or methyl. Most preferably each $R_{18}$ is hydrogen.

$X_1$ is preferably $X_1'$, where $X_1'$ is

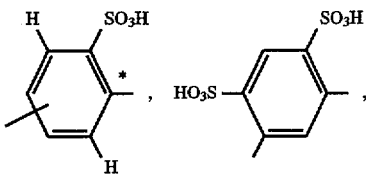

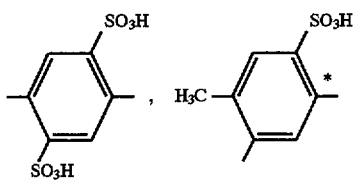

or

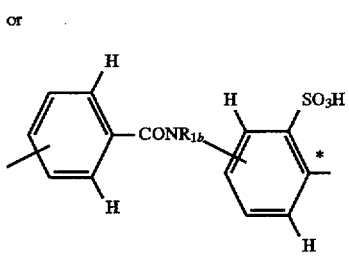

in which the marked carbon atom is attached to the azo group. More preferably $X_1$ is $X_1''$, where $X_1''$ is

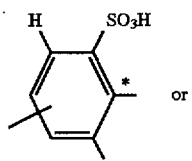

or

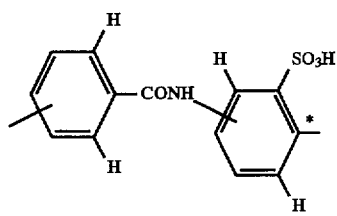

in which the marked carbon atom is attached to the azo group.

In $X_2$, q is preferably 1.

$X_2$ is preferably $X_2'$, where $X_2'$ is

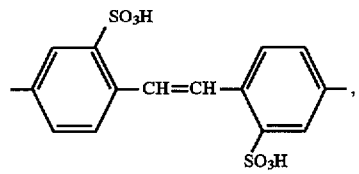

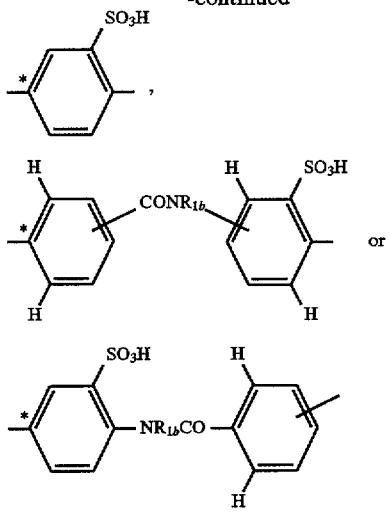

in which the marked carbon atom is attached to the $Z_a$-$NR_1$-group. More preferably it is $X_2''$, where $X_2''$ is

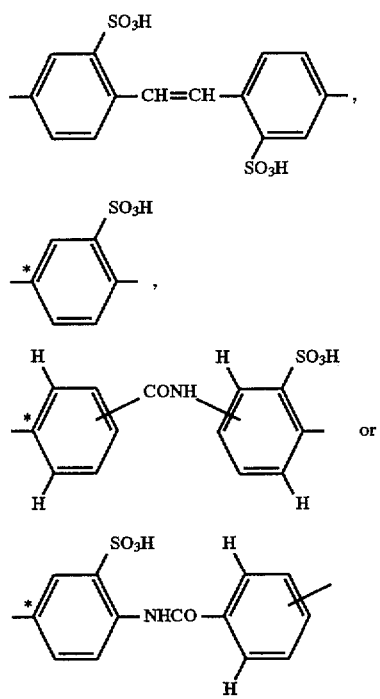

in which the marked carbon atom is attached to the $Z_a$-$NR_1$-group.

($d_1$) is preferably ($d_1'$) and more preferably ($d_1''$) of the formulae

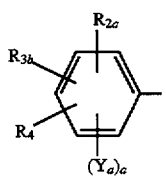

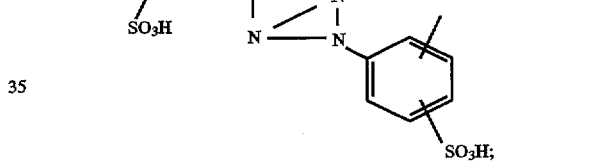

($d_2$) is preferably ($d_2'$) and more preferably ($d_2''$) of the formulae

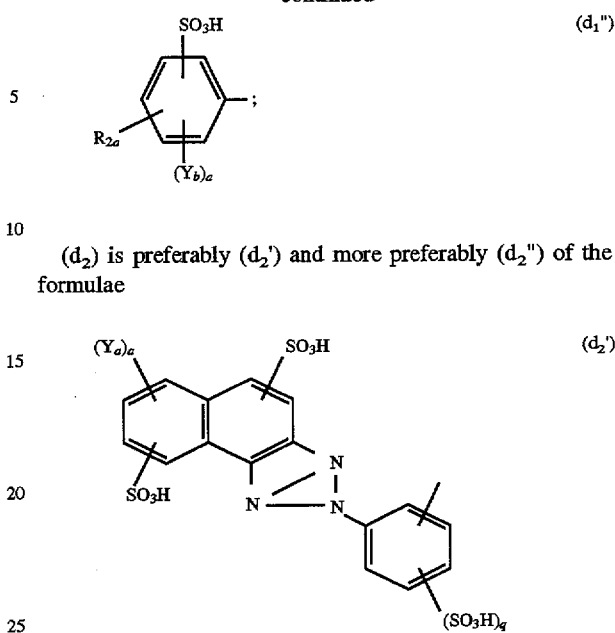

($d_3$) is preferably ($d_3'$), more preferably ($d_3''$) in which the substituents are in the following positions:

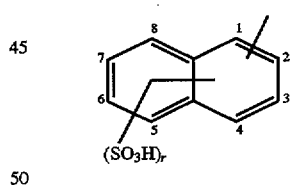

a) when the azo group is in the 1-position and r is 2, the sulpho groups are in the 3,6-; 3,8-; 4,6- or 4,8-positions; more preferably in the 3,6-positions;

b) when the azo group is in the 1-position and r is 3, the sulpho groups are in the 3,6,8-positions;

c) when the azo group is in the 2-position and r is 2, the sulpho groups are in the 1,5-; 3,6-; 4,8-; 5,7- or 6,8-positions; more preferably in the 1,5- or 4,8-positions;

d) when the azo group is in the 2-position and r is 3, the sulpho groups are in the 3,6,8- or 4,6,8-positions.

($d_4$) is preferably ($d_4'$) of the formula

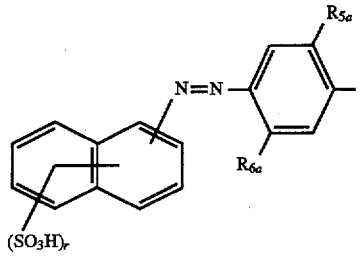 ($d_4'$)

and most preferably ($d_4''$) which is ($d_4'$) wherein $R_{5a}$ is hydrogen and $R_{6a}$ is $R_{6b}$; and where in each ($d_4'$) and ($d_4''$) the positions of the sulpho groups in the naphthyl ring related to the azo group are those as given for ($d_3'$) and ($d_3''$), respectively.

($d_5$) is preferably ($d_5'$) of the formula

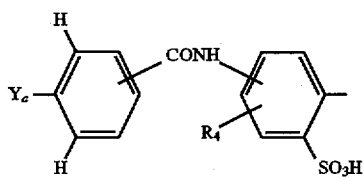 ($d_5'$)

and more preferably ($d_5''$) as ($d_5'$) in which $Y_a$ is $Y_b$.

($d_6$) is preferably ($d_6'$) and more preferably ($d_6''$) of the formulae

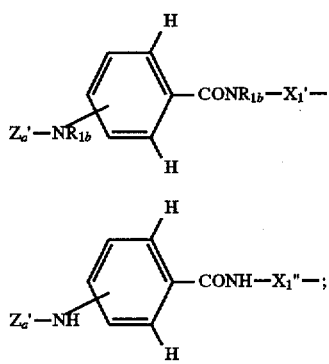

($d_6'$)

($d_6''$)

($d_7$) is preferably ($d_7'$) and more preferably ($d_7''$) of the formulae

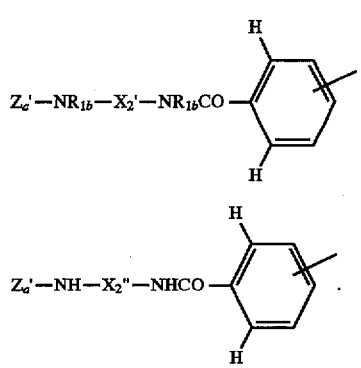

($d_7'$)

($d_7''$)

($k_1$) is preferably ($k_1'$) and more preferably ($k_1''$) of the formulae

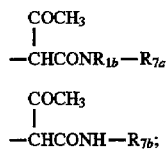

$$\begin{array}{c} COCH_3 \\ | \\ -CHCONR_{1b}-R_{7a} \end{array} \quad (k_1')$$

$$\begin{array}{c} COCH_3 \\ | \\ -CHCONH-R_{7b} \end{array} \quad (k_1'');$$

($k_2$) is preferably ($k_2'$) and more preferably ($k_2''$) of the formulae

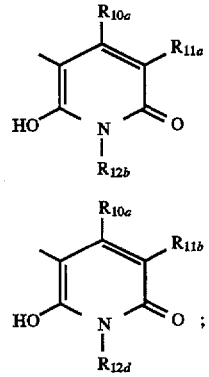

($k_2'$)

($k_2''$)

($k_3$) is preferably ($k_3'$) and more preferably ($k_3''$) of the formulae

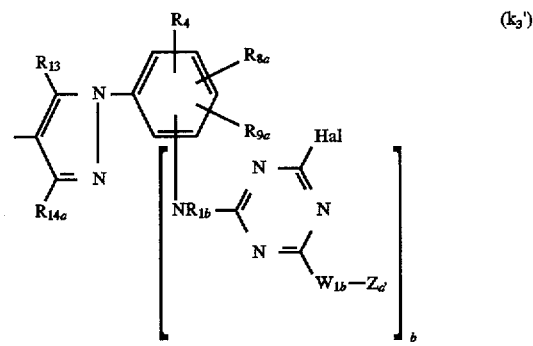 ($k_3'$)

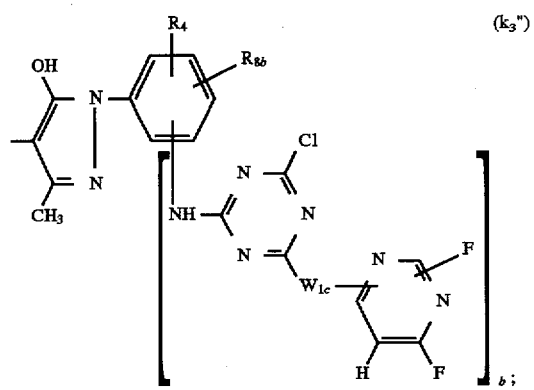 ($k_3''$)

($k_4$) is preferably ($k_4'$) and more preferably ($k_4''$) of the formulae

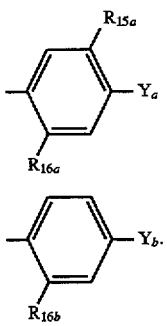 (k₄')

 (k₄")

Preferred compounds of formula I correspond to formula Ia $$D_a-N=N-K_a \quad \text{Ia}$$

and salts thereof, in which $D_a$ is one of the radicals $(d_1')$ to $(d_5')$ as defined above, and $K_a$ is one of the radicals $(k_1')$ to $(k_4')$ as defined above, where the same provisos (i) to (iv) set forth for the compounds of formula I apply accordingly;
or to formula Ib

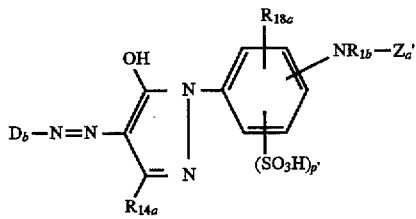 Ib and salts thereof, in which $D_b$ is one of the radicals $(d_1')$ to $(d_4')$ or $(d_6')$ or $(d_7')$ and p' is 1 or 2, where in the case that two radicals $Z_a'$ are present, these are identical;
with the proviso that when $D_b$ is one of the radicals $(d_1')$ to $(d_4')$,
at least one $Z_a'$ is

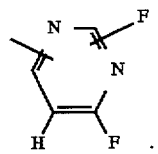

More preferred compounds of formula Ia are those in which $D_a$ is $D_a'$, where $D_a'$ is one of the radicals $(d_1'')$ to $(d_5'')$, and $K_a$ is $K_a'$, where $K_a'$ is one of the radicals $(k_1'')$ to $(k_4'')$.

More preferred compounds of formula Ib are those in which (1) $R_{18a}$ is $R_{18b}$ and especially hydrogen;
(2) $R_{14a}$ is carboxy;
(3) p' is 1;
(4) each $R_{1b}$ is hydrogen; and
(5) in case where two groups $Z_a'$ are present, both $Z_a'$ are

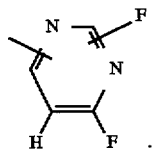

Most preferred are compounds of formula Ic

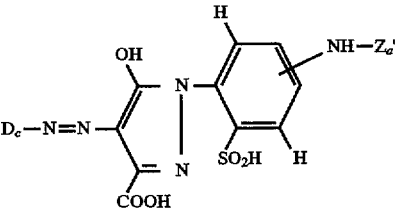 Ic and salts thereof, in which $D_c$ is $(d_6'')$ or $(d_7'')$ and in which the two groups $Z_a'$ are the same.

When a compound of formula I is in salt form, the cation associated with the sulpho groups and any carboxy group is not critical and may be any one of those non-chromophoric cations conventional in the field of fibre-reactive dyes provided that the corresponding salts are water-soluble. Examples of such cations are alkali metal cations and unsubstituted and substituted ammonium cations, e.g., lithium, sodium, potassium, ammonium, mono-, di-, tri- and tetra-methylammonium, tri-ethylammonium and mono-, di- and tri- ethanolammonium.

The preferred cations are the alkali metal cations and ammonium, with sodium being the most preferred.

In a compound of formula I the cations of the sulpho and any carboxy groups can be the same or different, e.g., they can also be a mixture of the above mentioned cations meaning that the compound of formula I can be in a mixed salt form.

The invention further provides a process for the preparation of compounds according to formula I or mixtures thereof, comprising reacting the diazonium salt of an amine of formula II, $$D-NH_2 \quad \text{II}$$

in which D is as defined above,
with a compound of formula III, $$K-H \quad \text{III}$$

in which K is as defined above.

It is also possible to use a compound of formula III in which instead of $Z_a$ the free amino group $-NR_1-H$ is still present which, after the coupling reaction has been completed, may be reacted with a compound $Z_a$-Hal, wherein Hal is fluoro or chloro.

Compounds of formula I in which D is $(d_6)$ or $(d_7)$ and both $Z_a$ are identical, preferably may be prepared by reacting 1 mole of a compound of formula IV

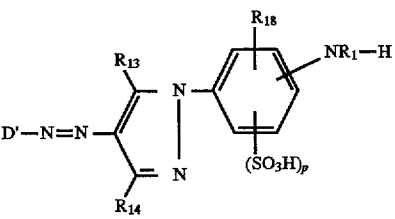 IV in which D' is

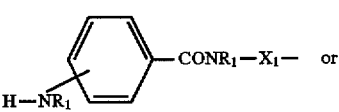

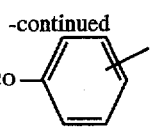

and $R_1$, $R_{13}$, $R_{14}$, $R_{18}$, p, $X_1$ and $X_2$ are as defined above, with at least 2 moles of a compound $Z_a$-Hal in which $Z_a$ is as defined above and Hal is fluoro or chloro.

Diazotisation and coupling may be carried out in accordance with conventional methods; the pH of the coupling reaction has to be adapted in accordance with each different coupling component used.

The condensation of an amino group with a compound $Z_a$-Hal is suitably carried out at a slightly elevated temperature in the range of from 20°–60° C., and at a pH of 4–7.

The compounds of formula I may be isolated in accordance with known methods, for example, by conventional salting out with alkali metal salt, filtering and drying optionally in vacuo and at slightly elevated temperatures.

Depending on the reaction and isolation conditions a compound of formula I is obtained in free acid or preferably salt form or even mixed salt form containing, for example, one or more of the above mentioned cations. It may be converted from free acid form to a salt form or mixture of salt forms or vice versa or from one salt form to another by conventional means.

It should be noted that any group $Z_a$ corresponding to the formula

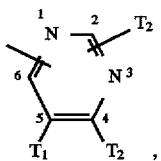

in which $T_1$ is hydrogen, cyano or chloro and $T_2$ is fluoro or chloro, can occur in two isomeric forms, with the floating fluoro or chloro substituent in either the 2- or the 6-position.

In general, it is preferred to use this mixture of resulting dyestuffs as it is without resorting to the isolation of a single isomer for use, but should this be desired it can be readily achieved by conventional methods.

The starting compounds of formulae II, III and IV as well as $Z_a$-Hal are either known or may be readily made from known starting materials by known methods.

The compounds of formula I and mixtures thereof are useful as fibre-reactive dyestuffs for dyeing or printing hydroxy group- or nitrogen-containing organic substrates. Preferred substrates are leather and fibre material comprising natural or synthetic polyamides and, particularly, natural or regenerated cellulose such as cotton, viscose and spun rayon. The most preferred substrate is textile material comprising cotton.

Dyeing or printing is effected in accordance with known methods conventional in the fibre-reactive dyestuff field. Preferably, for the compounds of formula I the exhaust dyeing method is used at temperatures within the range of from 30° to 80° C., particularly at 50°–60° C., whereby a liquor to goods ratio of 6:1 to 30:1 is used and more preferably of 10:1 to 20:1.

The compounds of this invention have good compatibility with known fibre-reactive dyes; they may be applied alone or in combination with appropriate fibre-reactive dyestuffs of the same class having analogous dyeing properties such as common fastness properties and the extent of ability to exhaust from the dyebath onto the fibre. The dyeings obtained with such combination mixtures have good fastness properties and are comparable to those obtained with a single dyestuff.

The compounds of formula I give good exhaust and fixation yields when used as dyestuffs. Moreover, any unfixed compound is easily washed off the substrate. The dyeings and prints derived from the compounds of formula I exhibit good light fastness and good wet fastness properties such as wash water, sea water and sweat fastness. They also exhibit good resistance to oxidation agents such as chlorinated water, hypochlorite bleach, peroxide bleach and perborate-containing washing detergents.

The following examples illustrate the invention. In the examples all parts and percentages are by weight unless indicated to the contrary, and all temperatures are given in degrees Centigrade.

EXAMPLE 1

63.1 Parts of the compound of the formula

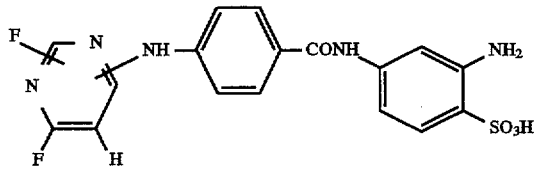

are stirred into 600 parts of water and 38 parts by volume of an aqueous 4N sodium nitrite solution are added thereto. The suspension thus obtained is added dropwise to a mixture of 45 parts of 30% hydrochloric acid and 300 parts of ice at 0°–5° and within 50 minutes. Stirring is effected for one further hour and after this the excess nitrite is decomposed by adding a small amount of sulphamic acid. Subsequently, 4.5 parts of 1-ethyl-6-hydroxy-4-methyl-3-sulphomethylpyridone(-2) dissolved in 500 parts of water, are added thereto, and afterwards the pH is adjusted to 7.0 by the addition of 320 parts by volume of 20% sodium carbonate solution. After coupling is complete, the dyestuff is precipitated from the yellow suspension obtained by adding 450 parts of sodium chloride, it is filtered off and dried. The dyestuff corresponds to the formula (shown in free acid form)

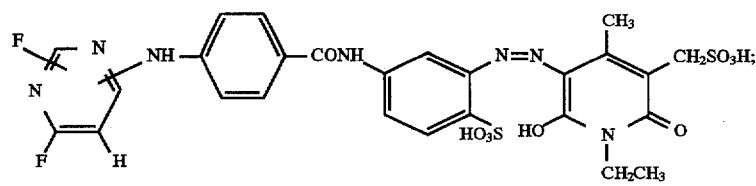

it dyes cotton in greenish yellow shades. These dyeings exhibit good fastness properties and are resistant to oxidative influences.

EXAMPLES 2–124

By analogy with the method described in Example 1, using appropriate starting compounds, further compounds of formula I can be prepared which are listed in the following Tables 1 to 3. They correspond to the formula (T)

$$A-N=N-B \quad (T)$$

in which the significances of each A and B are set forth in Tables 1–3.

In addition, the following symbols are used:

$Z_1$ for

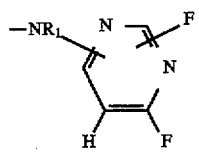

$Z_4$ for

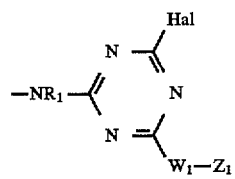

$Z_2$ for

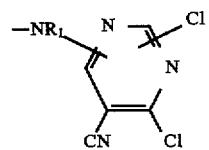

$Z_5$ for

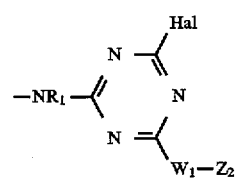

$Z_3$ for

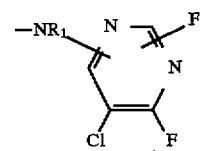

$Z_6$ for

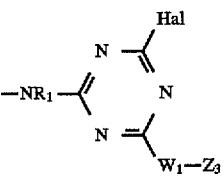

in Table 1, under column A $D_1$ is

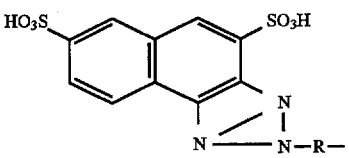

and $D_2$ is

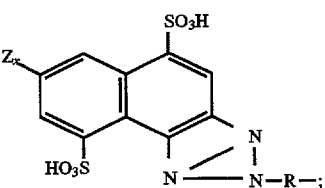

and in Table 2, under column A $D_3$ is

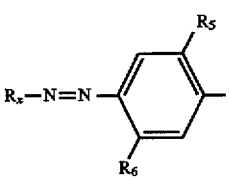

in which the symbols are as defined in Tables 1 and 2, respectively.

The compounds of Examples 2 to 124 may be applied to substrates which comprise cellulose fibres, and particularly to textile material comprising cotton using the conventional exhaust dyeing method or conventional printing processes, where dyeings or prints in greenish yellow to golden yellow shades are obtained. These dyeings and prints on cotton show good properties with respect to light fastness and wet fastnesses and are resistant to oxidative influences.

TABLE 1

Example 2-64

| Ex. No. | A | -R- | $Z_x$ | $R_1$ | Hal | $-W_1-$ | B |
|---|---|---|---|---|---|---|---|
| 2 | SO₃H-substituted methylphenyl ($Z_x$) | — | $Z_1$ | H | — | — | 5-methyl-3-methoxy-4-(-CHCONH-)(-COCH₃)-benzenesulfonic acid |
| 3 | $D_2$ | methylphenyl-SO₃H (*) | " | H | — | — | " |
| 4 | " | methylphenyl-SO₃H (*) | " | CH₃ | — | — | " |
| 5 | " | " | " | H | — | — | " |
| 6 | $D_1$ | — | — | H | — | — | 2-SO₃H-4-$Z_1$-(-CHCONH-)(-COCH₃)-phenyl |
| 7 | 2,5-dimethoxy-methylphenyl | — | — | H | — | — | " |
| 8 | 3-methyl-1,5-disulfonaphthyl | — | — | CH₃ | — | — | " |

TABLE 1-continued

Example 2-64

| Ex. No. | A | -R- | $Z_x$ | $R_1$ | Hal | $-W_1-$ | B |
|---|---|---|---|---|---|---|---|
| 9 | 4-methyl-2-methoxy-5-sulfophenyl | — | — | H | Cl | $-*NHCH_2CHNH-$ with $CH_3$ | 4-($Z_4$)-2-sulfo-phenyl with $-CHCONH-$ / $COCH_3$ |
| 10 | 3-methyl-5,7-disulfo-naphthyl | — | — | H | Cl | " | " |
| 11 | " | — | — | H | F | " | 4-($Z_4$)-2-sulfo-phenyl with $-CHCONH-$ / $COCH_3$ |
| 12 | $D_1$ | 2,5-disulfo-phenyl (dimethyl) | — | H | Cl | $-NHCH_2CH_2NH-$ | 2-sulfo-5-sulfo-phenyl with $-CHCONH-$ / $COCH_3$ |
| 13 | 2-sulfo-$Z_x$-phenyl | — | $Z_4$ | H | Cl | $-*NHCH_2CH_2CH_2N-$ with $CH_3$ | " |
| 14 | $D_2$ | 2,5-disulfo-phenyl | — | H | Cl | $-*NHCH_2CHNH-$ with $CH_3$ | " |
| 15 | " | " | — | H | F | " | " |
| 16 | $D_2$ | *-2-sulfo-phenyl | $Z_4$ | H | Cl | $-NHCH_2CHCH_2NH-$ with $OH$ | 2-sulfo-phenyl with $-CHCONH-$ / $COCH_3$ |

TABLE 1-continued

Example 2-64

| Ex. No. | A | —R— | $Z_x$ | $R_1$ | Hal | $-W_1-$ | B |
|---|---|---|---|---|---|---|---|
| 17 | " | " | " | H | F | " | " |
| 18 | | | $Z_1$ | H | — | — | (naphthalene with SO₃H, SO₃H, NHCOCH-COCH₃, SO₃H) |
| 19 | $D_2$ | (benzene with SO₃H, SO₃H) | $Z_1$ | H | — | — | (naphthalene with SO₃H, NHCOCH-COCH₃, HO₃S) |
| 20 | | (benzene with OCH₃, OCH₃) | — | H | — | — | (naphthalene with SO₃H, $Z_1$, SO₃H, NHCOCH-COCH₃) |
| 21 | | (naphthalene with SO₃H, SO₃H, SO₃H, CH₃) | — | H | — | — | " |
| 22 | | (naphthalene with SO₃H, SO₃H, SO₃H, CH₃) | — | CH₃ | — | — | (naphthalene with SO₃H, $Z_1$, SO₃H, NHCOCH-COCH₃) |

TABLE 1-continued

Example 2-64

| Ex. No. | A | -R- | $Z_x$ | $R_1$ | Hal | $-W_1-$ | B |
|---|---|---|---|---|---|---|---|
| 23 | $D_1$ | ![aryl with SO3H, *]  | — | H | Cl | $-*NHCH_2CH_2CH_2N\begin{smallmatrix}-\\CH_3\end{smallmatrix}$ — $CH_3$ | naphthalene-1,5-(SO$_3$H)$_2$ with -CH(COCH$_3$)CONH- at 3-position and $Z_4$ at 7-position |
| 24 | (naphthalene-1,5-diSO$_3$H with CH$_3$) | — | — | H | Cl | " | " |
| 25 | $D_2$ | ![aryl with SO3H, *] | $Z_1$ | H | — | — | 1-H-3-CH$_2$SO$_3$H-4-CH$_3$-6-OH-pyridin-2-one |
| 26 | (aryl with SO$_3$H, CH$_3$, $Z_x$) | — | — | H | — | — | " |
| 27 | " | — | — | H | — | — | 1-CH$_3$-3-CH$_2$SO$_3$H-4-CH$_3$-6-OH-pyridin-2-one |

TABLE 1-continued

Example 2-64

| Ex. No. | A | —R— | $Z_x$ | $R_1$ | Hal | —$W_1$— | B |
|---|---|---|---|---|---|---|---|
| 28 | " | — | " | H | — | — | pyridone with CH₃, CONH₂, CH₂CH₃, OH |
| 29 | 2-methyl-4-Zx-benzene-SO₃H | — | $Z_4$ | H | Cl | *NH—C₆H₃(NH—)(SO₃H) | pyridone with CH₃, CH₂SO₃H, CH₂CH₃, OH |
| 30 | " | — | " | H | F | —NHCH₂CHCH₂NH— with OH | " |
| 31 | " | — | " | CH₃ | Cl | —NHCH₂CHCH₂NH— with OH | " |
| 32 | 5-SO₃H-2-methyl-4-Zx-benzene (H₃C) | — | $Z_4$ | H | Cl | " | pyridone with CH₃, CH₂SO₃H, CH₃, OH |
| 33 | " | — | " | CH₃ | Cl | " | " |
| 34 | " | — | " | H | F | *NHCH₂CHNH— with CH₃ | " |
| 35 | " | — | " | H | Cl | *NH—C₆H₃(NH—)(SO₃H) | " |
| 36 | $D_2$ | 2-methyl-benzene-SO₃H (*) | $Z_4$ | H | Cl | *NH— | pyridone with CH₃, CH₃, OH |

TABLE 1-continued

Example 2-64

| Ex. No. | A | -R- | $Z_x$ | $R_1$ | Hal | $-W_1-$ | B |
|---|---|---|---|---|---|---|---|
| 37 | " | " | " | $CH_3$ | Cl | -*NHCH$_2$CHNH- <br>              \|<br>             $CH_3$ | (pyridone structure with $CH_3$, $CH_2Z_1$, $CH_3$, HO, N-$CH_3$, C=O) |
| 38 | $D_1$ | (benzene ring with *, SO$_3$H, CH$_3$) | — | H | — | — | " |
| 39 | | (naphthalene with SO$_3$H, SO$_3$H, CH$_3$) | — | $CH_3$ | — | — | " |
| 40 | | (naphthalene with SO$_3$H, SO$_3$H, CH$_3$) | — | H | — | — | " |
| 41 | | (benzene with SO$_3$H, SO$_3$H, CH$_3$) | — | H | — | — | " |

TABLE 1-continued

Example 2-64

| Ex. No. | A | -R- | $Z_x$ | $R_1$ | Hal | $-W_1-$ | B |
|---|---|---|---|---|---|---|---|
| 42 | (4-SO₃H, 2-)phenyl with $Z_x$ | — | $Z_1$ | H | — | — | 2,5-dichloro-4-SO₃H-phenyl-N=N-C(OH)=C(CH₃)-C(CH₃)= |
| 43 | (4-SO₃H, 5-CH₃, 2-)phenyl with $Z_x$ | — | = | H | — | — | = |
| 44 | (4-SO₃H, 2-)phenyl with $Z_x$ | — | = | H | — | — | 2-CH₃-4-SO₃H-phenyl-N=N-C(OH)=C(COOH)- |
| 45 | $D_2$ | 2-CH₃-5-SO₃H-phenyl (*) | = | H | — | — | = |
| 46 | (3-SO₃H, 2-CH₃, 5-)phenyl with $Z_x$ | — | = | H | — | — | 3-SO₃H-phenyl-N=N-C(NH₂)=C(CH₃)- |

TABLE 1-continued

Example 2-64

| Ex. No. | A | —R— | $Z_x$ | $R_1$ | Hal | —$W_1$— | B |
|---|---|---|---|---|---|---|---|
| 47 | ![A group with Zx on phenyl] | — | " | H | — | — | phenyl with SO₃H groups, N=N, OH, CH₃ |
| 48 | $D_2$ | phenyl with SO₃H groups | $Z_x$ | H | Cl | —*NH—C₆H₄—CONH—C₆H₃(CH₃)(SO₃H) | " |
| 49 | phenyl with SO₃H groups | — | " | H | Cl | —NHCH₂CH₂CH₂NH— | phenyl with Cl, SO₃H, N=N, OH, CH₃ |
| 50 | $D_2$ | phenyl with SO₃H (*) | $Z_1$ | H | — | — | phenyl with $Z_4$, SO₃H, N=N, OH, COOH |
| 51 | $D_1$ | phenyl with SO₃H (*) | — | H | Cl | —NHCH₂CHCH₂NH—<br>    OH | |

TABLE 1-continued

Example 2-64

| Ex. No. | A | —R— | $Z_x$ | $R_1$ | Hal | $-W_1-$ | B |
|---|---|---|---|---|---|---|---|
| 52 | [naphthalene with SO₃H, SO₃H, SO₃H, CH₃ substituents] | — | — | CH₃ | Cl | " | [phenyl with $Z_1$, CH₃, NHCONH₂] |
| 53 | [benzene with OCH₃, CH₃, OCH₃, SO₃H] | — | — | H | — | — | " |
| 54 | [benzene with SO₃H, CH₃, SO₃H] | — | — | H | — | — | [phenyl with $Z_1$, CH₃, NHCONH₂] |
| 55 | $D_1$ | [benzene with SO₃H, SO₃H] | — | H | Cl | —*NHCH₂CHNH—<br>           CH₃ | " |
| 56 | " | " | — | H | F | — | [benzene with OCH₃, $Z_1$, $Z_4$, CH₃] |
| 57 | [benzene with SO₃H, CH₃] | — | — | CH₃ | — | — | " |
| 58 | [benzene with HOOC, CH₃] | — | — | H | — | — | " |

TABLE 1-continued

Example 2-64

| Ex. No. | A | —R— | $Z_x$ | $R_1$ | Hal | —$W_1$— | B |
|---|---|---|---|---|---|---|---|
| 59 | $D_1$ | 2-methyl-5-SO₃H phenyl (* at 5-position) | — | H | — | — | 2-methyl-5-$Z_1$-phenyl with NHCOCH₃ at 2-position (ortho to methyl) |
| 60 | " | " | — | CH₃ | — | — | 2-methyl-5-$Z_4$-phenyl with NHCOCH₃ |
| 61 | 2-methyl-5-Cl-4-SO₃H phenyl | — | — | H | Cl | —*NHCH₂CHNH—<br>       |<br>      CH₃ | 4-methyl-$Z_4$-phenyl |
| 62 | 2-methyl-4-SO₃H-?-SO₃H phenyl | — | — | H | Cl | —*NH— linked to phenyl-CONH-phenyl(2-methyl-SO₃H) | " |
| 63 | " | — | — | H | Cl | —NHCH₂CHCH₂NH—<br>              |<br>             OH | " |
| 64 | " | — | — | H | F | " | " |

TABLE 2

Examples 65-101

| Ex. No. | A | $R_5$ | $R_6$ | $R_1$ | Hal | —$W_1$— | B |
|---|---|---|---|---|---|---|---|
| 65 | $D_3$ (naphthalene with $SO_3H$, $SO_3H$, $CH_3$, optionally with $R_x$) | H | —NHCONH$_2$ | H | " | " | benzene with $CH_3O$, $SO_3H$, $Z_1$, —CHCONH—COCH$_3$ |
| 66 | $D_3$ (naphthalene with $SO_3H$, $SO_3H$, $CH_3$) | H | " | H | — | — | benzene with $SO_3H$, $Z_1$, —CHCONH—COCH$_3$ |
| 67 | " | H | —NHCOCH$_3$ | CH$_3$ | — | — | " |
| 68 | " (naphthalene with $SO_3H$, $SO_3H$, $CH_3$) | OCH$_3$ | CH$_3$ | H | — | — | naphthalene with $SO_3H$, $SO_3H$, $Z_1$, —CHCONH—COCH$_3$ |
| 69 | biphenyl with $CH_3$, $SO_3H$, CONH, $Z_1$ | — | — | H | — | — | benzene with $CH_3$, $SO_3H$, $OCH_3$, —CHCONH—COCH$_3$ |

TABLE 2-continued
Examples 65-101
| Ex. No. | A | optionally with $R_x$ | $R_5$ | $R_6$ | $R_1$ | Hal | $-W_1-$ | B |
|---|---|---|---|---|---|---|---|---|
| 70 | 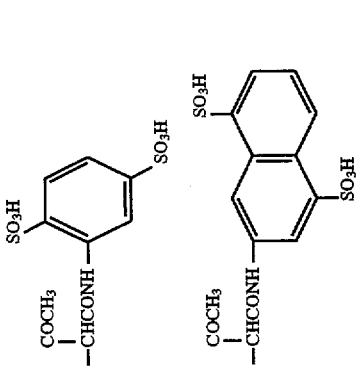 | " | — | — | H | — | — | 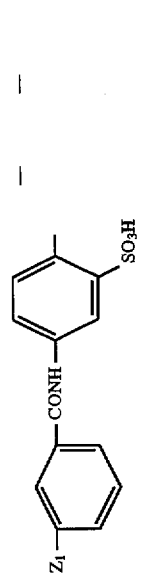 |
| 71 | 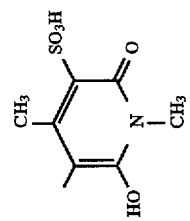 | | — | — | H | — | — | 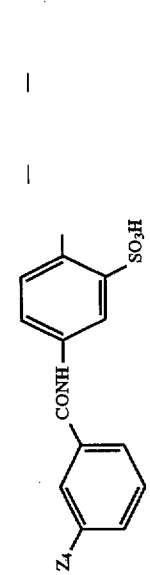 |
| 72 |  | | — | — | H | Cl | $-NH-$ ... $-NH-$ (with $SO_3H$ substituents) | 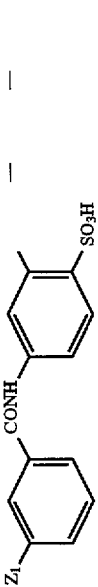 |
| 73 | " | | — | — | H | Cl | $-*NHCH_2CHNH-$ <br> $\quad\quad\quad\ \ |$ <br> $\quad\quad\quad\ CH_3$ | " |
| 74 | " | | — | — | H | F | " | " |
| 75 | 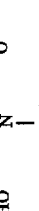 | | — | — | H | — | — | 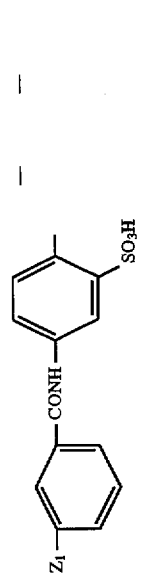 |

TABLE 2-continued

Examples 65-101

| Ex. No. | A | R₅ | R₆ | R₁ | Hal | —W₁— | B |
|---|---|---|---|---|---|---|---|
| 76 | A (optionally with Rₓ): 4-Z₁-phenyl-CONH-phenyl(CH₃)(SO₃H) | — | — | H | — | — | 1-methyl-3-CH₂SO₃H-4-CH₃-6-OH-pyridin-2-one |
| 77 | " | — | — | H | — | — | 1-H-3-CH₂SO₃H-4-CH₃-6-OH-pyridin-2-one |
| 78 | 4-Z₄-phenyl-CONH-phenyl(CH₃)(SO₃H)(SO₃H) | — | — | H | Cl | —*NHCH₂CHNH— \| CH₃ | 1-H-3-CONH₂-4-CH₃-6-OH-pyridin-2-one |
| 79 | 4-Z₄-phenyl-CONH-phenyl(CH₃)(SO₃H) | — | — | H | Cl | —*NHCH₂CH₂N— \| CH₃ | 1-ethyl-3-CH₂SO₃H-4-CH₃-6-OH-pyridin-2-one |
| 80 | " | — | — | H | Cl | —NHCH₂CHCH₂NH— \| OH | " |
| 81 | " | — | — | CH₃ | Cl | " | " |
| 82 | " | — | — | H | F | " | " |

TABLE 2-continued

Examples 65-101

| Ex. No. | A | optionally with $R_x$ | $R_5$ | $R_6$ | $R_1$ | Hal | —$W_1$— | B |
|---|---|---|---|---|---|---|---|---|
| 83 | $D_3$ | naphthalene with SO₃H, CH₃, SO₃H, SO₃H | H | H | H | — | — | pyridone with CH₃, CH₂Z₁, OH, C=O, NH |
| 84 | " | " | H | —NHCOCH₃ | H | — | — | pyridone with CH₃, CH₂Z₄, OH, C=O, N—CH₃ |
| 85 | " | " | OCH₃ | H | H | Cl | —NHCH₂CH₂NH— | pyridone with CH₃, CH₂Z₁, OH, C=O, N—CH₂CH₃ |
| 86 | " | " | " | CH₃ | H | Cl | —*NHCH₂CHNH— $\phantom{-}$ CH₃ | " |
| 87 | " | " | H | —NHCONH₂ | H | F | " | " |
| 88 | $D_3$ | naphthalene with SO₃H, CH₃, SO₃H | H | CH₃ | H | — | — | phenyl-N=N-pyrazolone with Z₁, OH, CH₃ |

TABLE 2-continued

Examples 65–101

| Ex. No. | A | optionally with $R_x$ | $R_5$ | $R_6$ | $R_1$ | Hal | $-W_1-$ | B |
|---|---|---|---|---|---|---|---|---|
| 89 | " | naphthalene with CH$_3$, SO$_3$H, SO$_3$H, SO$_3$H | H | H | CH$_3$ | — | — | phenyl-N=N-C(NH$_2$)=C(CH$_3$)-C(=O)-CH$_3$ with Z$_1$ |
| 90 | " | naphthalene with CH$_3$, SO$_3$H, SO$_3$H, SO$_3$H | OCH$_3$ | CH$_3$ | H | Cl | $-*NHCH_2CH_2CH_2N(CH_3)-$ | 4-Z$_4$-2-SO$_3$H-phenyl-N=N-C(OH)=C(CH$_3$)-COOH |
| 91 | " | " | " | " | H | F | $-NHCH_2CHCH_2NH-$ with OH | = |
| 92 | " | naphthalene with CH$_3$, SO$_3$H, SO$_3$H | H | $-NHCOCH_3$ | H | Cl | phenyl with NH-, -*NH, SO$_3$H | 3-SO$_3$H-4-OCH$_3$-6-Z$_4$-phenyl-N=N-C(OH)=C(CH$_3$)-COOH |
| 93 | " | naphthalene with CH$_3$, SO$_3$H, SO$_3$H | H | $-NHCONH_2$ | H | — | — | phenyl-N=N-C(OH)=C(CH$_3$)-C(=O)-CH$_3$ with Z$_1$ |

TABLE 2-continued

Examples 65–101

| Ex. No. | A | R₅ | R₆ | R₁ | Hal | —W₁— | B |
|---|---|---|---|---|---|---|---|
| 94 | optionally with Rₓ; 4-methyl-3-sulfo-phenyl-CONH-phenyl-Z₁ | — | — | H | — | — | 2-chloro-4-sulfophenyl-azo-(OH)(CH₃)C=C(CH₃)- |
| 95 | 3-methyl-4-sulfo-phenyl-CONH-phenyl-Z₁ | — | — | H | — | — | 4-sulfophenyl-azo-(OH)(CH₃)C=C(CH₃)- |
| 96 | 3-methyl-4-sulfo-phenyl-CONH-(3-Z₁-phenyl) | — | — | H | — | — | 2,5-disulfophenyl-azo-(OH)(CH₃)C=C(CH₃)- |
| 97 | 3-methyl-4-sulfo-phenyl-CONH-(4-Z₄-phenyl) | — | — | H | Cl | —*NHCH₂CHNH— \ CH₃ | 2-methyl-4-sulfophenyl-azo-(OH)(COOH)C=C(CH₃)- |
| 98 | D₃ (3,7-disulfo-5-sulfo-naphthyl) | H | H | H | — | — | 2-OCH₃-5-CH₃-phenyl-Z₁ |

TABLE 2-continued
Examples 65-101
| Ex. No. | A | optionally with $R_x$ | $R_5$ | $R_6$ | $R_1$ | Hal | $-W_1-$ | B |
|---|---|---|---|---|---|---|---|---|
| 99 | " |  | H | $-NHCOCH_3$ | H | Cl | $-NHCH_2CH_2CH_2NH-$ |  |
| 100 | " | " | H | " | H | F | " | " |
| 101 | " |  | $CH_3$ | $CH_3$ | H | — | — |  |

TABLE 3

Examples 102-124

| Ex. No. | A | R₁ | Hal | —W₁— | B |
|---|---|---|---|---|---|
| 102 | Z₁-C₆H₄-CONH-C₆H₃(SO₃H)- | H | — | — | 2-OCH₃-4,5-dimethyl-phenyl with Z₁ |
| 103 | Z₁-C₆H₄-CONH-C₆H₂(SO₃H)₂- | H | — | — | 2,4,5-trimethylphenyl with Z₁ |
| 104 | Z₁-C₆H₄-CONH-C₆H₃(SO₃H)- | H | — | — | phenyl with NHCONH₂ and Z₁ |
| 105 | Z₅-C₆H₄-CONH-C₆H₃(SO₃H)- | H | Cl | —*NHCH₂CH(CH₃)NH— | " |
| 106 | Z₁-C₆H₄-CONH-C₆H₃(SO₃H)- | H | Cl | " | —C₆H₄—Z₄ |
| 107 | " | H | F | " | " |
| 108 | " | H | — | — | pyridone (CH₃, CH₂Z₁, HO, N-CH₃) |
| 109 | 2-SO₃H, 5-Z₁ phenyl | H | — | — | " |
| 110 | 2-SO₃H, 4-Z₃ phenyl | H | — | — | " |
| 111 | 2-SO₃H, 5-Z₄ phenyl | H | Cl | —NHCH₂CH(OH)CH₂NH— | pyridone (CH₃, CH₂Z₁, HO, N-CH₃) |

TABLE 3-continued

Examples 102–124

| Ex. No. | A | R₁ | Hal | —W₁— | B |
|---|---|---|---|---|---|
| 112 | 2-SO₃H, 5-Z₆ phenyl | H | Cl | " | " |
| 113 | 2-SO₃H, 5-Z₂ phenyl | H | — | — | " |
| 114 | 2-SO₃H, 5-Z₁ phenyl | H | — | — | 1-(2-SO₃H-4-Z₁-phenyl)-3-methyl-5-hydroxypyrazole |
| 115 | 2-SO₃H, 4-Z₂ phenyl | H | — | — | " |
| 116 | 2-SO₃H, 4-CH₃, 5-Z₁ phenyl | H | Cl | —*NHCH₂CH(CH₃)NH— | 1-(2-SO₃H-4-Z₄-phenyl)-3-methyl-5-hydroxypyrazole |
| 117 | " | H | — | — | 2-NHCONH₂, 5-Z₁ phenyl |
| 118 | 2-SO₃H, 5-Z₃ phenyl | H | Cl | —NHCH₂CH₂CH₂NH— | 2-OCH₃, 4-CH₃, 5-Z₄ phenyl |
| 119 | 2-SO₃H, 4-Z₁ phenyl | H | Cl | " | 2-NHCOCH₃, 5-Z₅ phenyl |
| 120 | " | H | F | —NHCH₂CH(OH)CH₂NH— | 2-OCH₃, 5-Z₄ phenyl |

TABLE 3-continued

Examples 102-124

| Ex. No. | A | R₁ | Hal | —W₁— | B |
|---|---|---|---|---|---|
| 121 | Z₁—C₆H₃(SO₃H)—CONH—C₆H₃(SO₃H)(CH₃)— | H | — | — | pyridone with CH₃, CH₂Z₁, HO, N-CH₃ |
| 122 | " | H | — | — | pyridone with CH₃, CH₂Z₂, HO, N-CH₃ |
| 123 | Z₁—C₆H₃(SO₃H)— | H | — | — | pyridone with CH₃, CH₂Z₁, HO, N-CH₂CH₃ |
| 124 | Z₄—C₆H₃(SO₃H)— | H | Cl | piperazine (—N⌒N—) | " |

EXAMPLE 125

160 Parts of the diaminoazo compound of the formula

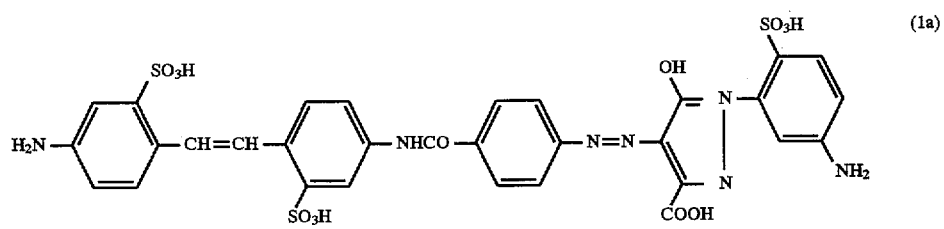

(1a)

which has been prepared in accordance with a conventional method, are dissolved in 2000 parts of water. At 25°–30°, 37.1 parts of 2,4,6-trifluoro-5-chloropyrimidine are added dropwise to this solution. During the addition, the pH of the reaction mixture is kept at 5.0 to 6.0 by continuous addition of 15% sodium carbonate solution. After the condensation is complete, the resultant dyestuff is precipitated with sodium chloride, filtered off and dried in vacuo at 50°. The dyestuff corresponds to the formula (shown in free acid form);

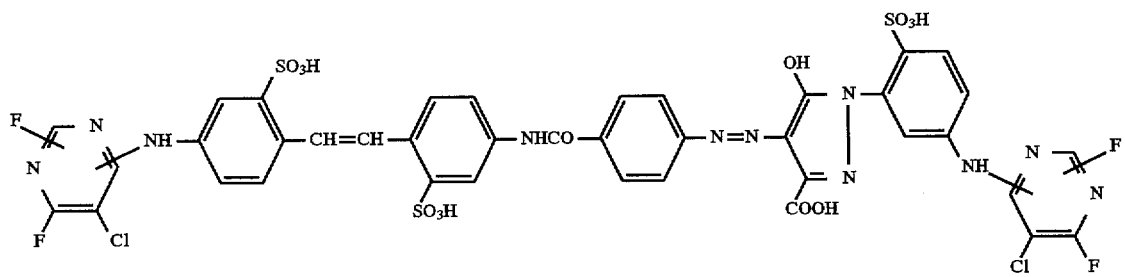

EXAMPLE 126

160 Parts of the diaminoazo compound of formula (Ia) described in Example 125, are dissolved in 2000 parts of water. To this solution 29.5 parts of 2,4,6-trifluoropyrimidine are added and stirring is effected at 40°–45°, until any free amino group is no longer detectable. Simultaneously, the acid set free during the reaction is buffered to a pH of 6–7 by continuously adding 15% sodium carbonate solution. The resultant dyestuff which corresponds to the formula (shown in free acid form)

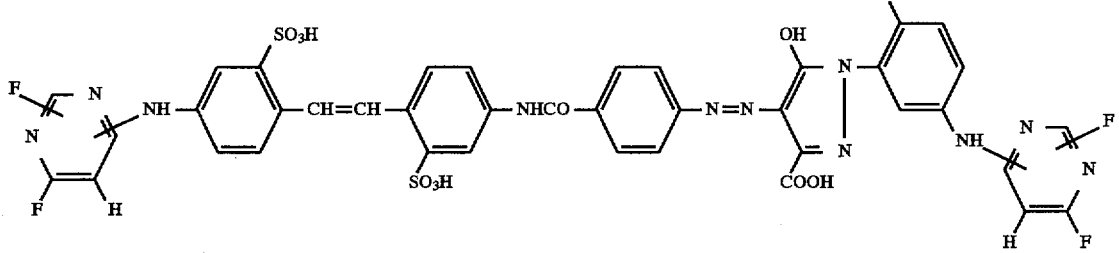

is precipitated with sodium chloride, filtered off and dried in vacuo at 50°. With this dyestuff yellow dyeings and prints on cotton are obtained which exhibit good general fastness properties and are resistant to oxidative influences.

EXAMPLES 127–219

By analogy with the method described in Example 125 and 126, using appropriate starting compounds, further compounds of formula I can be prepared which are listed in the following Tables 4 and 5. These compounds correspond to the formulae (T4) and (T5), where each formula is set forth on the top of the corresponding Table in which the symbols are defined.

In Table 4, under column X, the marked carbon atom is bound to the Z-NH-group of formula (T4); and in Table 5, under column X, the marked carbon atom is bound to the azo group of formula (T5).

Furthermore, in Tables 4 and 5 the following symbols are used:

$Z_1'$ for

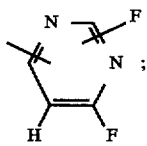

$Z_2'$ for

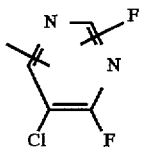

and $Z_3'$ for

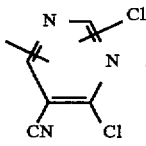

With the dyestuffs of Examples 127 to 219 yellow dyeings on cotton are obtained which exhibit good light- and wet-fastness properties.

TABLE 4

Examples 127-183 compounds of formula (T4)

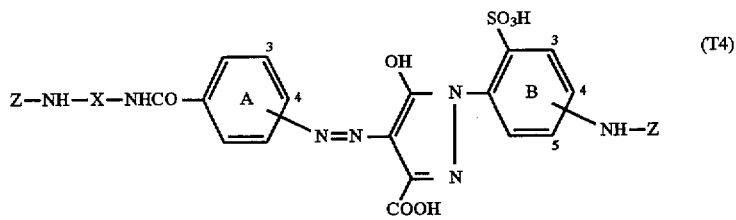

| Ex. No. | X | position of $-N=N-$ in ring A | position of $-NH-$ in ring B | Z |
|---|---|---|---|---|
| 127 | ![structure: 2,2'-stilbenedisulfonic acid with SO3H groups] | 4 | 4 | $Z_1'$ |
| 128 | " | 4 | 4 | $Z_2'$ |
| 129 | " | 4 | 4 | $Z_3'$ |
| 130 | " | 4 | 5 | $Z_3'$ |
| 131 | " | 3 | 4 | $Z_1'$ |
| 132 | " | 3 | 4 | $Z_2'$ |
| 133 | " | 3 | 4 | $Z_3'$ |
| 134 | " | 3 | 5 | $Z_2'$ |
| 135 | " | 3 | 5 | $Z_1'$ |
| 136 | ![structure: phenyl with SO3H] | 4 | 4 | $Z_1'$ |
| 137 | " | 4 | 4 | $Z_2'$ |
| 138 | " | 4 | 4 | $Z_3'$ |
| 139 | " | 3 | 4 | $Z_1'$ |
| 140 | " | 3 | 4 | $Z_2'$ |
| 141 | " | 3 | 5 | $Z_1'$ |
| 142 | " | 3 | 5 | $Z_2'$ |
| 143 | " | 4 | 5 | $Z_1'$ |
| 144 | " | 4 | 5 | $Z_2'$ |
| 145 | ![structure: phenyl-CONH-phenyl-SO3H] | 4 | 5 | $Z_1'$ |
| 146 | " | 4 | 5 | $Z_2'$ |
| 147 | " | 4 | 4 | $Z_1'$ |
| 148 | " | 4 | 4 | $Z_2'$ |
| 149 | " | 4 | 4 | $Z_3'$ |
| 150 | " | 3 | 4 | $Z_1'$ |
| 151 | " | 3 | 4 | $Z_2'$ |
| 152 | ![structure: phenyl-CONH-phenyl-SO3H] | 3 | 5 | $Z_1'$ |
| 153 | " | 3 | 5 | $Z_2'$ |
| 154 | " | 3 | 5 | $Z_3'$ |
| 155 | ![structure: phenyl-CONH-phenyl-SO3H] | 3 | 5 | $Z_1'$ |

TABLE 4-continued

Examples 127-183 compounds of formula (T4)

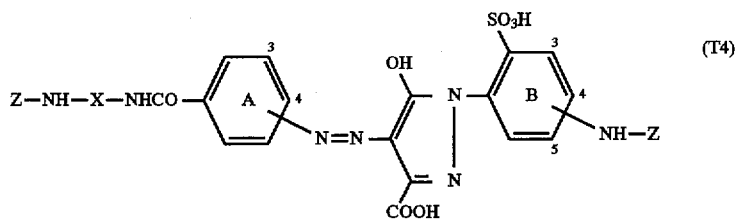

| Ex. No. | X | position of —N=N— in ring A | position of —NH— in ring B | Z |
|---|---|---|---|---|
| 156 | " | 3 | 5 | $Z_2'$ |
| 157 | " | 4 | 5 | $Z_1'$ |
| 158 | " | 4 | 4 | $Z_1'$ |
| 159 | " | 3 | 4 | $Z_1'$ |
| 160 | (2-SO₃H-phenyl)-NHCO-phenyl- | 4 | 4 | $Z_1'$ |
| 161 | " | 4 | 5 | $Z_1'$ |
| 162 | " | 3 | 4 | $Z_1'$ |
| 163 | " | 3 | 4 | $Z_2'$ |
| 164 | " | 3 | 5 | $Z_1'$ |
| 165 | (2-SO₃H-phenyl)-NHCO-(3-)phenyl- | 3 | 5 | $Z_1'$ |
| 166 | " | 3 | 5 | $Z_3'$ |
| 167 | " | 3 | 4 | $Z_1'$ |
| 168 | " | 4 | 4 | $Z_1'$ |
| 169 | " | 4 | 4 | $Z_2'$ |
| 170 | " | 4 | 5 | $Z_1'$ |
| 171 | phenyl-CONH-(2-SO₃H-phenyl)- | 4 | 5 | $Z_1'$ |
| 172 | " | 4 | 5 | $Z_2'$ |
| 173 | " | 4 | 4 | $Z_2'$ |
| 174 | " | 3 | 4 | $Z_1'$ |
| 175 | " | 3 | 4 | $Z_2'$ |
| 176 | " | 3 | 5 | $Z_1'$ |
| 177 | " | 3 | 5 | $Z_2'$ |
| 178 | (4-)phenyl-CONH-(3-SO₃H-phenyl)- | 3 | 5 | $Z_1'$ |
| 179 | " | 3 | 5 | $Z_2'$ |
| 180 | " | 3 | 4 | $Z_1'$ |
| 181 | " | 4 | 4 | $Z_1'$ |
| 182 | " | 4 | 4 | $Z_3'$ |
| 183 | " | 4 | 5 | $Z_1'$ |

TABLE 5
Examples 184–219 compounds of formula (T5)
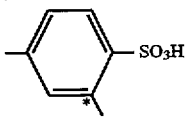
| Ex. No. | X | position of —N=N— in ring A | position of —NH— in ring B | Z |
|---|---|---|---|---|
| 184 | 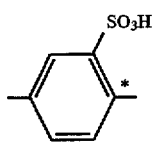 | 4 | 4 | $Z_1'$ |
| 185 | " | 4 | 4 | $Z_2'$ |
| 186 | " | 4 | 4 | $Z_3'$ |
| 187 | " | 4 | 5 | $Z_3'$ |
| 188 | " | 3 | 4 | $Z_1'$ |
| 189 | " | 3 | 4 | $Z_2'$ |
| 190 | 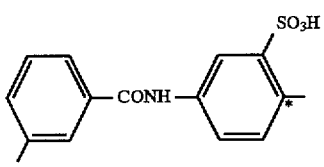 | 4 | 4 | $Z_1'$ |
| 191 | " | 3 | 4 | $Z_2'$ |
| 192 | " | 3 | 5 | $Z_1'$ |
| 193 | 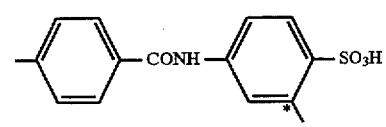 | 3 | 5 | $Z_1'$ |
| 194 | " | 3 | 5 | $Z_2'$ |
| 195 | " | 3 | 4 | $Z_1'$ |
| 196 | " | 4 | 5 | $Z_1'$ |
| 197 | " | 4 | 4 | $Z_1'$ |
| 198 | " | 4 | 4 | $Z_2'$ |
| 199 | " | 4 | 4 | $Z_3'$ |
| 200 | 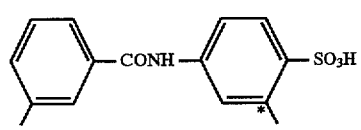 | 4 | 5 | $Z_1'$ |
| 201 | " | 4 | 5 | $Z_2'$ |
| 202 | " | 4 | 4 | $Z_1'$ |
| 203 | " | 4 | 4 | $Z_2'$ |
| 204 | " | 4 | 4 | $Z_3'$ |
| 205 | " | 3 | 4 | $Z_1'$ |
| 206 | " | 3 | 4 | $Z_2'$ |
| 207 | " | 3 | 5 | $Z_1'$ |
| 208 | " | 3 | 5 | $Z_2'$ |
| 209 | " | 3 | 5 | $Z_3'$ |
| 210 | 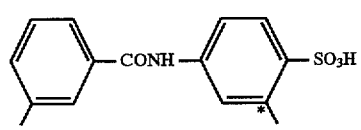 | 3 | 5 | $Z_1'$ |
| 211 | " | 3 | 5 | $Z_2'$ |
| 212 | " | 4 | 5 | $Z_1'$ |
| 213 | " | 4 | 4 | $Z_1'$ |

TABLE 5-continued

Examples 184-219 compounds of formula (T5)

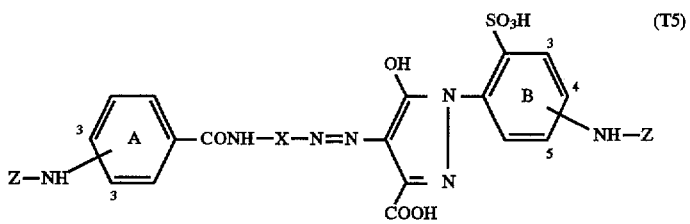

| Ex. No. | X | position of —N=N— in ring A | position of —NH— in ring B | Z |
|---|---|---|---|---|
| 214 | " | 3 | 4 | $Z_1'$ |
| 215 | 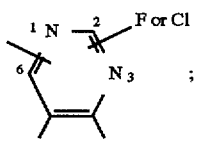 | 4 | 4 | $Z_1'$ |
| 216 | " | 4 | 5 | $Z_1'$ |
| 217 | " | 3 | 4 | $Z_1'$ |
| 218 | " | 3 | 4 | $Z_2'$ |
| 219 | " | 3 | 5 | $Z_1,$ |

By the preparation method described in Example 1, 125 or 126, the compounds of Examples 1–219 are obtained in their sodium salt form. By changing the reaction or isolation conditions or by using other known methods, it is possible to produce the compounds in the form of free acid or in other salt forms or mixed salt forms which contain one or more of the cations mentioned hereinabove.

As already mentioned hereinbefore in the description, the exemplified dyestuffs (and the corresponding free acids and other salt forms) contain two isomeric compounds regarding the radical $$\text{structure with } ^1N - ^2\text{(F or Cl)}, N_3, 6$$

one compound in which the floating fluoro- or chloro-substituent on the pyrimidine ring is in the 2-position and the corresponding compound wherein it is in the 6-position.

The obtained mixtures of isomeric dyestuffs may be used in conventional dyeing or printing processes; the isolation of a single isomer for use normally is unnecessary.

In the following examples, the application of the compounds of this invention is illustrated.

APPLICATION EXAMPLE A 0.3 Part of the dyestuff of Example 1 or 125 is dissolved in 100 parts of demineralised water and 8 parts of Glauber's salt (calcined) are added. The dyebath is heated to 50°, then 10 parts of cotton fabric (bleached) are added. After 30 minutes at 50°, 0.4 part of sodium carbonate (calcined) is added to the bath. During the addition of sodium carbonate the temperature is kept at 50°. Subsequently, the dyebath is heated to 600, and dyeing is effected for a further one hour at 60°.

The dyed fabric is then rinsed with running cold water for 3 minutes and afterwards with running hot water for a further 3 minutes. The dyeing is washed at the boil for 15 minutes in 500 parts of demineralised water in the presence of 0.25 part of Marseille soaps. After being rinsed with running hot water (for 3 minutes) and centrifuged, the dyeing is dried in a cabinet dryer at about 70°. A greenish yellow (yellow) cotton dyeing is obtained showing good fastness properties, and particularly high light- and wet-fastness properties, which is stable towards oxidative influences.

APPLICATION EXAMPLE B

To a dyebath containing in 100 parts of demineralised water 5 parts of Glauber's salt (calcined), 10 parts of cotton fabric (bleached) are added. The bath is heated to 50° within 10 minutes, and 0.5 part of the dyestuff of Example 1 or 125 is added. After a further 30 minutes at 50°, 1 part of sodium carbonate (calcined) is added. The dyebath is then heated to 60° and dyeing is continued at 60° for a further 45 minutes.

The dyed fabric is rinsed with running cold and then hot water and washed at the boil according to the method given in Application Example A. After rinsing and drying a greenish yellow (yellow) cotton dyeing is obtained which has the same good fastness properties as indicated in Application Example A.

Similarly, the dyestuffs of Examples 2–124 and 126 to 219 or mixtures of the exemplified dyestuffs may be employed to dye cotton in accordance with the method described in Application Example A or B. The cotton dyeings thus obtained are greenish yellow to golden yellow and show good fastness properties.

APPLICATION EXAMPLE C

A printing paste consisting of

| | |
|---|---|
| 40 parts | of the dyestuff of Example 1 or 125 |
| 100 parts | of urea |
| 350 parts | of water |
| 500 parts | of a 4% sodium alginate thickener and |
| 10 parts | of sodium bicarbonate |
| 1000 parts | in all | is applied to cotton fabric in accordance with conventional printing methods.

The printed fabric is dried and fixed in steam at 102°–104° for 4–8 minutes. It is rinsed in cold and then hot water, washed at the boil (according to the method described in Application Example A) and dried. A greenish yellow (yellow) print is obtained which has good general fastness properties.

Similarly, the dyestuffs of Examples 2 to 124 and 126 to 219 or mixtures of the exemplified dyestuffs may be employed to print cotton in accordance with the method given in Application Example C. All prints obtained are greenish yellow to golden yellow and show good fastness properties.

What is claimed is:

1. A compound of formula I

D—N=N—K  I or salts thereof, or a mixture of such compounds or salts, in which

D is one of the radicals ($d_2$) to ($d_5$),

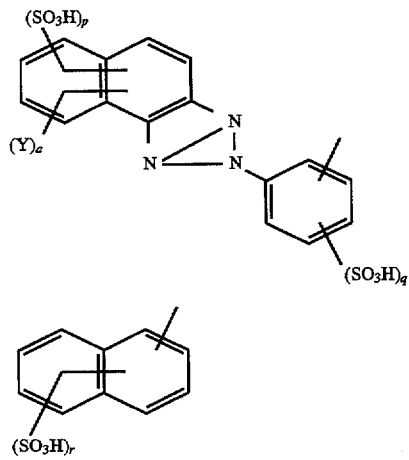

($d_2$)

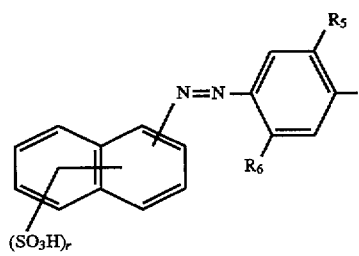

($d_3$)

($d_4$)

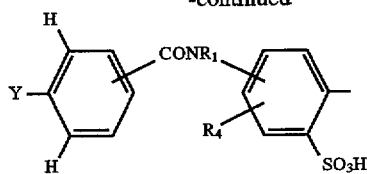

($d_5$)

and

K is one of the radicals ($k_1$) to ($k_4$);

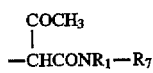

($k_1$)

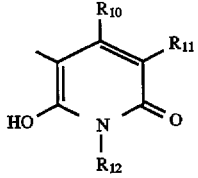

($k_2$)

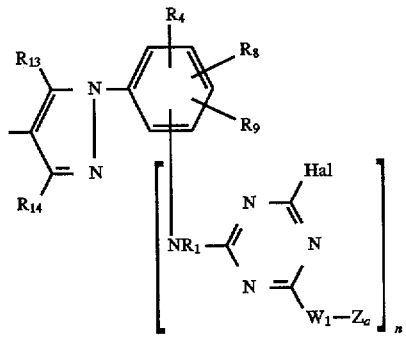

($k_3$)

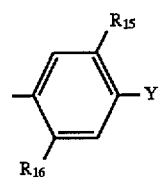

($k_4$)

with the provisos that (i) a compound of formula I contains at least one sulphonic acid group;

(ii) a compound of formula I contains one or two radicals Y;

(iii) at least one of the radicals Y contains the radical

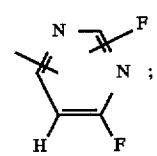

(iv) when D is ($d_3$) and K is ($k_4$), Y in ($k_4$) is other than

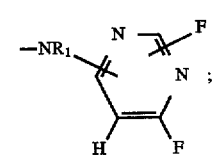

and (v) when D is ($d_4$) and K is ($k_4$); neither $R_{15}$ nor $R_{16}$ is hydrogen;

or

D is one of the radicals ($d_2$) or to ($d_4$) above, or ($d_6$) or ($d_7$) of the formula

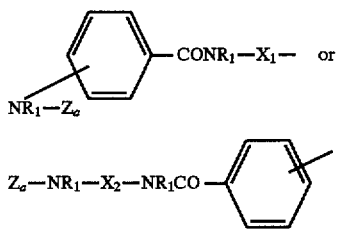 ($d_6$)

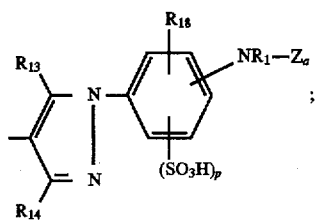 ($d_7$)

and

K is a radical ($k_5$)

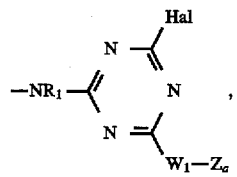 ($k_5$)

with the proviso that
when
D is ($d_2$) or to ($d_4$), the same provisos (i) to (iv) as given above apply;
in which
each
Y is independently —$NR_1$-$Z_a$ or

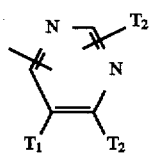

each
$Z_a$ is independently

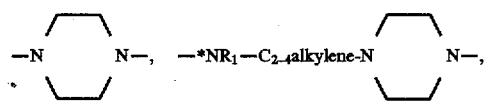

wherein $T_1$ is hydrogen, cyano or chloro, and the two $T_2$'s are the same and each $T_2$ is fluoro or chloro;
each of
a and b is independently 0 or 1,
each
$R_1$ is independently hydrogen, $C_{1-4}$alkyl or substituted $C_{1-4}$alkyl,
Hal is fluoro or chloro,
$W_1$ is —$NR_1$—$B_1$—$NR_1$—,

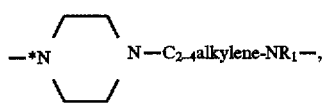

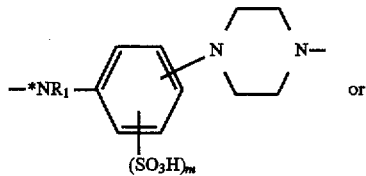

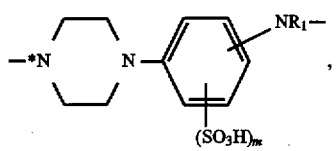

in which the marked nitrogen atom is attached to a carbon atom of the triazine ring;

$B_1$ is C2-6alkylene, —$C_{2-3}$alkylene-Q-$C_{2-3}$alkylene-, wherein Q is —O— or —$NR_1$—; $C_{3-4}$alkylene monosubstituted by hydroxy,

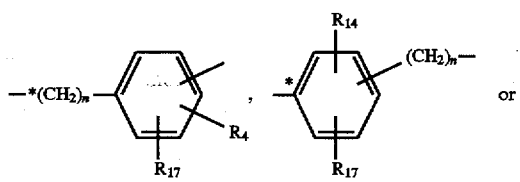

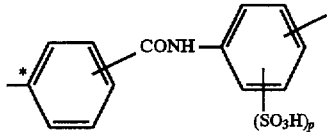

wherein the marked carbon atom is attached to the $NR_1$-group which is bound to a carbon atom of the triazine ring;
$R_4$ is independently hydrogen or sulpho,
$R_5$ is hydrogen, $C_{1-4}$alkyl or $C_{1-4}$alkoxy,
$R_6$ is hydrogen, $C_{1-4}$alkyl, $C_{1-4}$alkoxy, acetamido or —$NHCONH_2$,
$R_7$ is

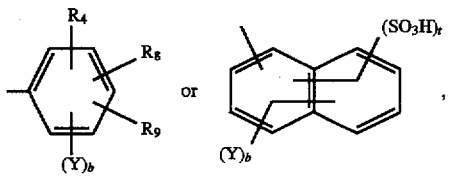

each
$R_8$ is independently hydrogen, $C_{1-4}$alkyl, $C_{1-4}$alkoxy, halogen or sulpho,
each
$R_9$ is independently hydrogen, $C_{1-4}$alkyl, $C_{1-4}$alkoxy, halogen or carboxy,
$R_{10}$ is $C_{1-4}$alkyl or —$CH_2SO_3H$,
$R_{11}$ is hydrogen; —$CONH_2$; sulpho; $C_{1-4}$alkyl which is monosubstituted by hydroxy, halogen, cyano, $C_{1-4}$alkoxy, sulpho, —$OSO_3H$ or —NH2; or —$CH_2$—Y, $R_{12}$ is hydrogen; $C_{1-4}$alkyl; substituted $C_{1-6}$alkyl; cyclohexyl; phenyl or phenyl which is substituted by 1 to 3 substituents selected from halogen, $C_{1-4}$alkyl, $C_{1-4}$alkoxy, sulpho and carboxy; phenyl($C_{1-4}$alkyl) or phenyl($C_{1-4}$alkyl) the phenyl ring of which is substituted by 1 to 3 substituents selected from halogen, $C_{1-4}$alkyl, $C_{1-4}$alkoxy, sulpho and carboxy;

each $R_{13}$ is hydroxy or —$NH_2$, each $R_{14}$ is $C_{1-4}$alkyl, carboxy or —$CONH_2$, $R_{15}$ is hydrogen, $C_{1-4}$alkyl or $C_{1-4}$alkoxy, $R_{16}$ is hydrogen, $C_{1-4}$alkyl, $C_{1-4}$alkoxy, acetamido or —$NHCONH_2$, $R_{17}$ is hydrogen, $C_{1-4}$alkyl, $C_{1-4}$alkoxy, carboxy or sulpho, and each $R_{18}$ is independently hydrogen, halogen, $C_{1-4}$alkyl or $C_{1-4}$alkoxy;

$X_1$ is

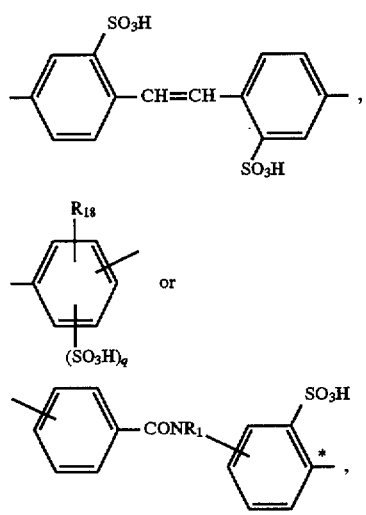

wherein the marked carbon atom is bound to the azo group, and $X_2$ is

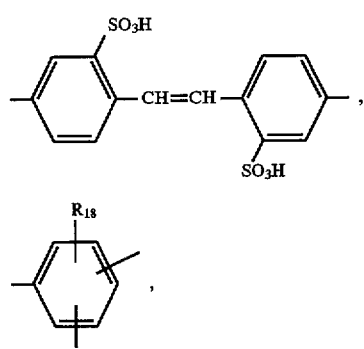

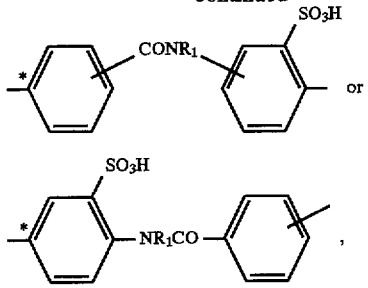

wherein the marked carbon atom is attached to the $Z_a$-$NR_1$-group;

m is 0 or 1, n is 0 or an integer 1 to 4, each p is independently 0, 1 or 2, each q is independently 1 or 2, each r is 2 or 3, and t is 1, 2 or 3.

2. A compound according to claim 1 in which Y is $Y_b$, where $Y_b$ is

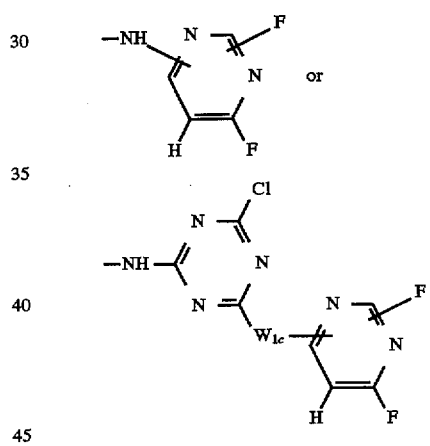

wherein $W_{1c}$ is —NH—$B_{1c}$—NH— in which $B_{1c}$ is —$CH_2CH_2$—, —$CH_2CH_2CH_2$—, —*$CH_2CH$(CH_3)$— or —$CH_2CH(OH)CH_2$— and the marked carbon atom is bound to the —NH-group which is attached to a carbon atom of the triazine ring.

3. A compound according to claim 2, in which $R_5$ is hydrogen, methyl or methoxy, and $R_6$ is hydrogen, methyl, methoxy, acetamido or —$NHCONH_2$.

4. A compound according to claim 2, in which $R_8$ is hydrogen, methyl, methoxy, chloro or sulpho, and $R_9$ is hydrogen, methyl, methoxy or chloro.

5. A compound according to claim 2, in which $R_{10}$ is methyl or —$CH_2SO_3H$; $R_{11}$ is hydrogen, —$CH_2SO_3H$ or —$CH_2$—$Y_b$, in which $Y_b$ is as defined in claim 2; and $R_{12}$ is hydrogen, methyl, ethyl, cyclohexyl or —$C_{1-4}$alkylene-$E_a$, wherein $E_a$ is carboxy, sulpho, —$OSO_3H$, hydroxy or —$NR_{19a}R_{20a}$ and each of $R_{19a}$ and $R_{20a}$ is independently hydrogen, methyl, ethyl, 2-hydroxyethyl or phenyl($C_{1-2}$alkyl), or —$NR_{19a}R_{20a}$ is piperidino, morpholino or piperazino.

6. A compound according to claim 2, in which $R_{18}$ is hydrogen, chloro, methyl or methoxy.

7. A compound according to claim 6, in which $X_1$ is

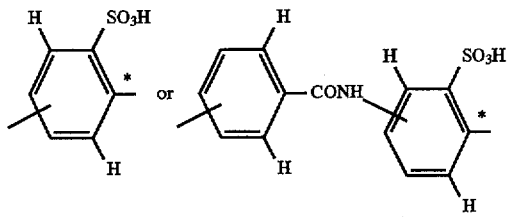

wherein the marked carbon atom is attached to the azo group.

8. A compound according to claim 6, in which $X_2$ is

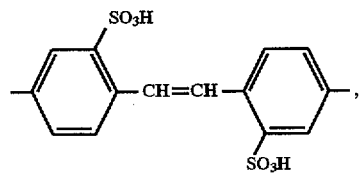

in which the marked carbon atom is bound to the $Z_a$-$NR_1$- group.

9. A compound according to claim 1, which corresponds to formula Ia

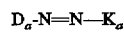　　　　　　　　　　　Ia or salts thereof, in which $D_a$ is one of the radicals ($d_2'$) to ($d_5'$),

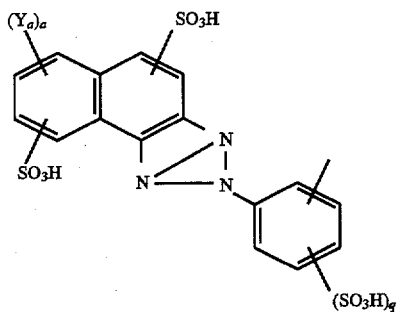          ($d_2'$)

wherein q is 1 or 2, a is 0 or 1, and each $Y_a$ is —$NR_{1b}$—$Z_a'$ or

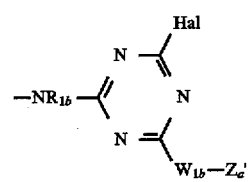

in which each $R_{1b}$ is independently hydrogen or methyl,

Hal is fluoro or chloro, $W_{1b}$ is —$NR_{1b}$—$B_{1b}$—$NR_{1b}$— or

wherein $B_{1b}$ is linear or branched $C_{2-3}$alkylene, —$CH_2CH(OH)CH_2$— or

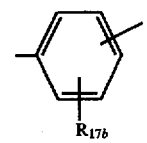

and $R_{17b}$ is hydrogen or sulpho; and $Z_a'$ is

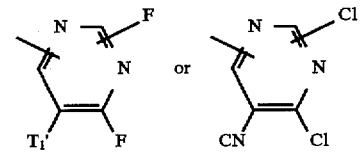

wherein $T_1'$ is hydrogen or chloro;

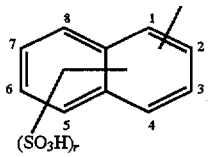 (d₃')

in which r is 2 or 3 and the substituents are in the following positions:

a) when the azo group is in the 1-position and r is 2, the sulpho groups are in the 3,6-; 3,8-; 4,6- or 4,8- positions;

b) when the azo group is in the 1-position and r is 3, the sulpho groups are in the 3,6,8-positions;

c) when the azo group is in the 2-position and r is 2, the sulpho groups are in the 1,5-; 3,6-; 4,8-; 5,7- or 6,8- positions;

d) when the azo group is in the 2-position and r is 3, the sulpho groups are in the 3,6,8- or 4,6,8-positions;

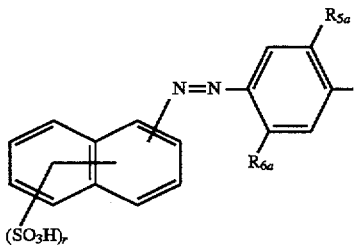 (d₄')

in which r is 2 or 3 and the sulpho groups in the naphthyl ring are in the same positions as shown for (d₃') above, $R_5a$ is hydrogen, methyl or methoxy, and $R_{6a}$ is hydrogen, methyl, methoxy, acetamido or —NHCONH₂;

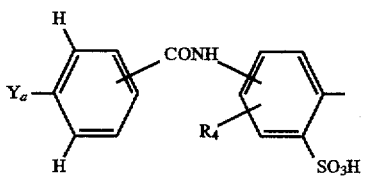 (d₅')

in which $Y_a$ is as defined above and $R_4$ is hydrogen or sulpho;

$K_a$ is one of the radicals (k₁') to (k₄'),

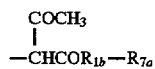 (k₁')

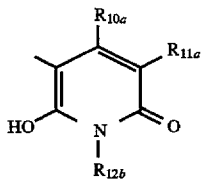 (k₂')

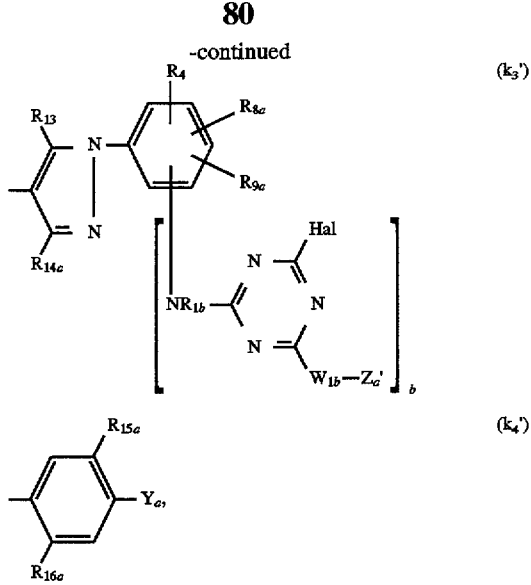

in which $R_{1b}$, $R_4$, $Y_a$, Hal, $W_{1b}$ and $Z_a'$ are as defined above, b is 0 or 1;

$R_{7a}$ is

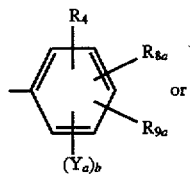

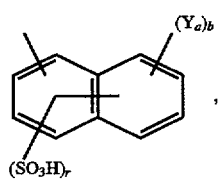

wherein $R_4$, $Y_a$, b and r are as defined above, $R_{8a}$ is hydrogen, methyl, methoxy, chloro or sulpho, $R_{9a}$ is hydrogen, methyl, methoxy or chloro;

$R_{10a}$ is methyl or —CH₂SO₃H, $R_{11a}$ is hydrogen, —CONH₂, sulpho, —CH₂SO₃H or —CH₂—$Y_a$, wherein $Y_a$ is as defined above, $R_{12b}$ is hydrogen, methyl, ethyl, cyclohexyl or —C₁₋₄alkylene-$E_a$, wherein $E_a$ is carboxy, sulpho, —OSO₃H, hydroxy or —NR₁₉ₐR₂₀ₐ, in which each of $R_{19a}$ and $R_{20a}$ is independently hydrogen, methyl, ethyl, 2-hydroxyethyl or phenyl(C₁₋₂alkyl), or —NR₁₉ₐR₂₀ₐ is piperidino, morpholino or piperazino, $R_{8a}$ and $R_{9a}$ are as defined above, $R_{13}$ is hydroxy or —NH₂, $R_{14a}$ is methyl or carboxy;

$R_{15a}$ is hydrogen, methyl or methoxy, and $R_{16a}$ is hydrogen, methyl, methoxy, acetamido or —NHCONH₂;

in which compounds of formula Ia the same provisos (i) to (v) set forth in claim 1 for compounds of formula I apply accordingly.

10. A compound according to claim 1, which corresponds to formula Ib

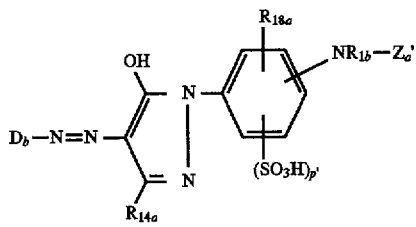

Ib or salts thereof, in which $D_b$ is one of the radicals ($d_2'$) to ($d_4'$) or ($d_6'$) or ($d_7'$),

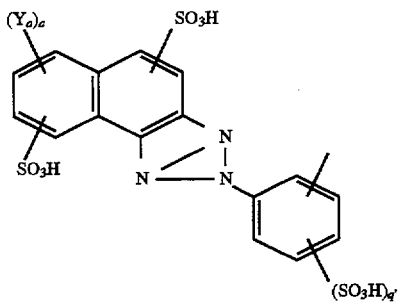

($d_2'$)

wherein $R_{2a}$ is hydrogen, methyl, methoxy or sulpho,
$R_{3b}$ is hydrogen, methyl or methoxy,
$R_4$ is hydrogen or sulpho,
q is 1 or 2,
a is 0 or 1, and
each
$Y_a$ is —$NR_{1b}$-$Z_a'$ or

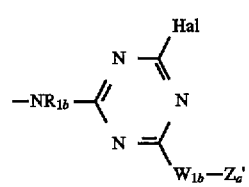

in which
each
$R_{1b}$ is independently hydrogen or methyl,
Hal is fluoro or chloro,
$W_{1b}$ is —$NR_{1b}$—$B_{1b}$—$NR_{1b}$— or

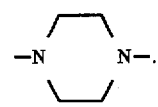

wherein $B_{1b}$ is linear or branched $C_{2-3}$alkylene, —$CH_2CH(OH)CH_2$— or

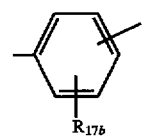

and $R_{17b}$ is hydrogen or sulpho; and $Z_a'$ is

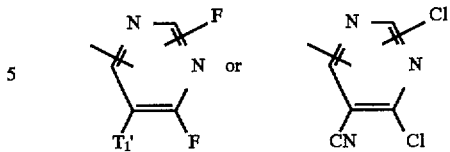

wherein $T_1'$ is hydrogen or chloro;

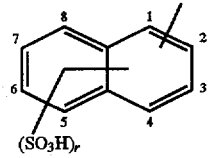

($d_3'$)

in which r is 2 or 3 and the substituents are in the following positions:

a) when the azo group is in the 1-position and r is 2, the sulpho groups are in the 3,6-; 3,8-; 4,6- or 4,8-positions;

b) when the azo group is in the 1-position and r is 3, the sulpho groups are in the 3,6,8-positions;

c) when the azo group is in the 2-position and r is 2, the sulpho groups are in the 1,5-; 3,6-; 4,8-; 5,7- or 6,8-positions;

d) when the azo group is in the 2-position and r is 3, the sulpho groups are in the 3,6,8- or 4,6,8-positions;

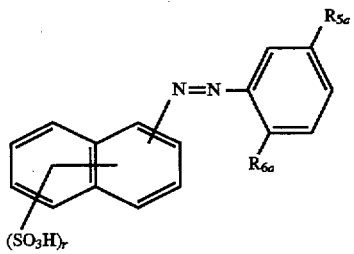

($d_4'$)

in which r is 2 or 3 and the sulpho groups in the naphthyl ring are in the same positions as shown for ($d_3'$) above, $R_{5a}$ is hydrogen, methyl or methoxy, and
$R_{6a}$ is hydrogen, methyl, methoxy, acetamido or —NHCONH$_2$;

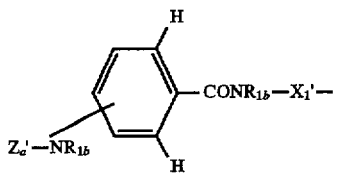

($d_6'$)

($d_7'$)

in which
each
$R_{1b}$ and $Z_a'$ is as defined above, $X_1'$ is

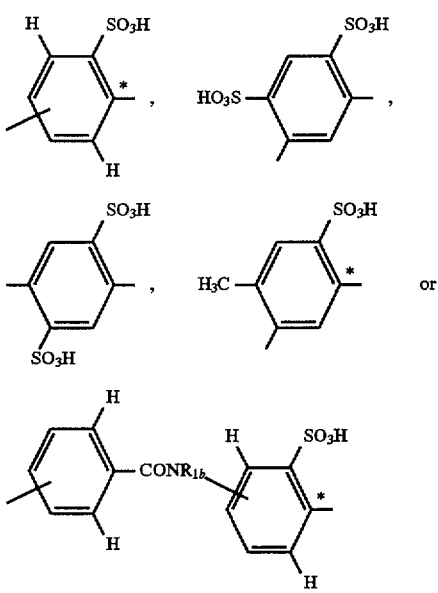

wherein $R_{1b}$ is as defined above and the marked carbon atom is attached to the azo group; and $X_2'$ is

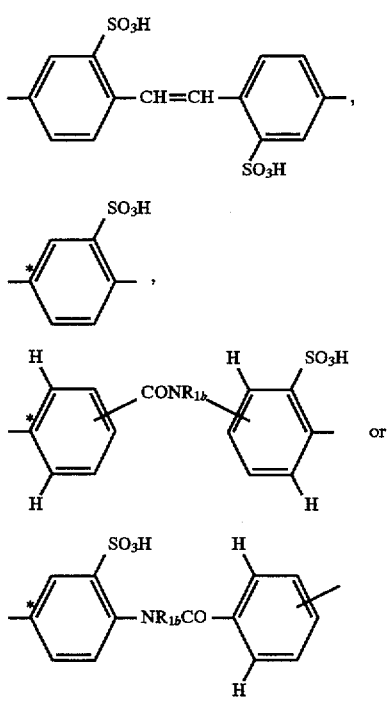

wherein $R_{1b}$ is as defined above and the marked carbon atom is attached to the $Z_a'$-$NR_{1b}$-group;

$R_{14a}$ is methyl or carboxy,
$R_{18a}$ is hydrogen, chloro, methyl or methoxy,
p' is 1 or 2, and
$R_{1b}$ and $Z_a'$ are as defined above;
with the proviso that
i) when $D_b$ is one of the radicals $(d_2')$ to $(d_4')$, at least one $Z_a'$ is

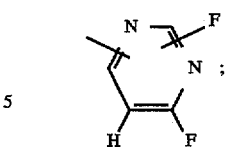

and ii) when two radicals $Z_a'$ are present, these are identical.

11. A compound according to claim 10, in which $R_{14a}$ is carboxy, $R_{18a}$ is hydrogen, p' is 1 and each $R_{1b}$ is hydrogen.

12. A compound according to claim 10, which corresponds to formula Ic,

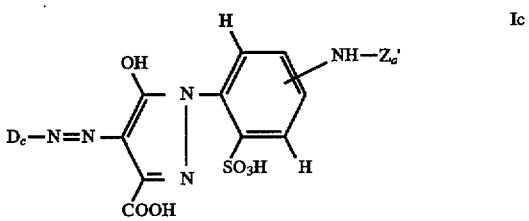 Ic or salts thereof, in which $D_c$ is one of the radicals $(d_6'')$ and $(d_7'')$

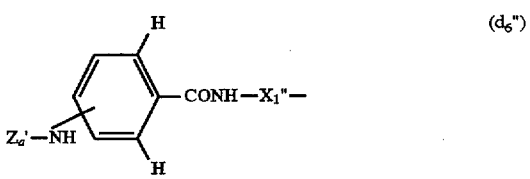 $(d_6'')$

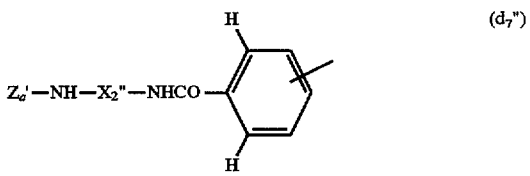 $(d_7'')$ wherein $X_1''$ is

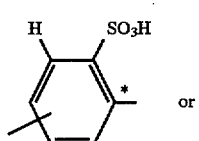 or

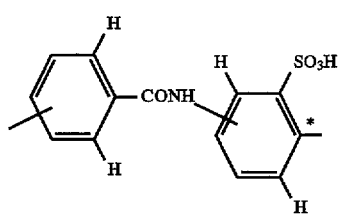

in which the marked carbon atom is attached to the azo group;

$X_2''$ is

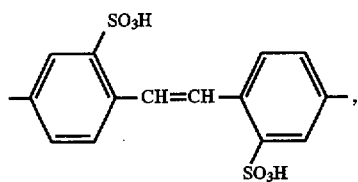

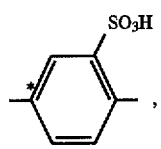

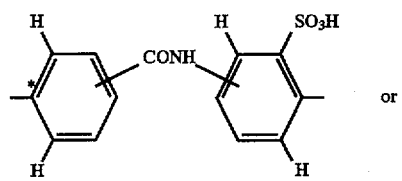 or

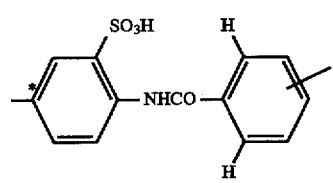

in which the marked carbon atom is attached to the $Z_a'$-NH-group;

each $Z_a'$ is as defined in claim 11 and the two groups $Z_a'$ are the same.

13. A process for dyeing or printing a hydroxy group- or nitrogen-containing organic substrate comprising applying to the substrate a compound of formula I according to claim 1, or a mixture thereof.

14. A process according to claim 13, wherein the substrate is a fibre material comprising natural or regenerated cellulose.

15. A compound according to claim 1 wherein D is one of the radicals $(d_2)$ to $(d_5)$.

16. A compound according to claim 15 wherein K is $(k_3)$.

17. A compound according to claim 1 wherein D is one of the radicals $(d_6)$ or $(d_7)$.

* * * * *